US010065367B2

(12) United States Patent
Brown, Jr.

(10) Patent No.: US 10,065,367 B2
(45) Date of Patent: *Sep. 4, 2018

(54) PHONON GENERATION IN BULK MATERIAL FOR MANUFACTURING

(71) Applicant: Chevron Phillips Chemical Company LP, The Woodlands, TX (US)

(72) Inventor: Alfred E. Brown, Jr., Collinsville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 452 days.

This patent is subject to a terminal disclaimer.

(21) Appl. No.: 14/664,378

(22) Filed: Mar. 20, 2015

(65) Prior Publication Data

US 2016/0271870 A1 Sep. 22, 2016

(51) Int. Cl.
*B29C 67/00* (2017.01)
*B28B 1/093* (2006.01)
(Continued)

(52) U.S. Cl.
CPC ........ *B29C 67/0033* (2013.01); *B22F 3/1055* (2013.01); *B28B 1/093* (2013.01); *B29C 64/129* (2017.08); *B29C 64/141* (2017.08); *B29C 64/153* (2017.08); *B29C 64/286* (2017.08); *B29C 64/291* (2017.08); *B29C 64/35* (2017.08); *B33Y 10/00* (2014.12); *B33Y 30/00* (2014.12); *C04B 35/64* (2013.01); *B22F 3/008* (2013.01); *B22F 3/093* (2013.01); *B22F 2003/1056* (2013.01); *B22F 2999/00* (2013.01); *B28B 1/001* (2013.01); *B29K 2023/06* (2013.01); *B29K 2023/12* (2013.01);
*B29K 2025/06* (2013.01); *B29K 2055/00* (2013.01); *B29K 2065/00* (2013.01); *B29K 2083/00* (2013.01); *B29K 2105/251* (2013.01); *B29K 2105/253* (2013.01); *B33Y 50/02* (2014.12);
(Continued)

(58) Field of Classification Search
None
See application file for complete search history.

(56) References Cited

U.S. PATENT DOCUMENTS 4,961,154 A * 10/1990 Pomerantz ............. G09B 23/00
264/255
6,722,872 B1 4/2004 Swanson et al.
(Continued)

FOREIGN PATENT DOCUMENTS

WO 2017068435 A1 4/2017

OTHER PUBLICATIONS

American Physical Society. "Quantum leap for phonon lasers." ScienceDaily. ScienceDaily, Feb. 24, 2010.
(Continued)

*Primary Examiner* — Seyed Masoud Malekzadeh
*Assistant Examiner* — Manley L Cummins, IV
(74) *Attorney, Agent, or Firm* — Fletcher Yoder P.C.

(57) ABSTRACT

Disclosed embodiments include the formation of an article of manufacture by a process in which vibrations are generated in a bulk material disposed within a build chamber. The vibrations are focused within a section of the base material, and the focusing is controlled to cause the section of the base material to undergo a physical transformation to form at least a portion of the article of manufacture.

9 Claims, 8 Drawing Sheets

(51) Int. Cl.
    B33Y 10/00      (2015.01)
    B33Y 30/00      (2015.01)
    B29C 64/291     (2017.01)
    B29C 64/35      (2017.01)
    B29C 64/153     (2017.01)
    B29C 64/129     (2017.01)
    B29C 64/286     (2017.01)
    B22F 3/105      (2006.01)
    C04B 35/64      (2006.01)
    B29C 64/141     (2017.01)
    B28B 1/00       (2006.01)
    B22F 3/00       (2006.01)
    B22F 3/093      (2006.01)
    B29K 105/00     (2006.01)
    B29K 23/00      (2006.01)
    B29K 25/00      (2006.01)
    B29K 83/00      (2006.01)
    B29K 55/00      (2006.01)
    B33Y 50/02      (2015.01)

(52) U.S. Cl.
    CPC .... C04B 2235/66 (2013.01); C04B 2235/667 (2013.01); Y02P 10/295 (2015.11)

(56) References Cited

U.S. PATENT DOCUMENTS

| | | | |
|---|---|---|---|
| 7,297,304 B2 | 11/2007 | Swanson et al. | |
| 7,679,066 B2 | 3/2010 | Hyde et al. | |
| 7,718,975 B2 | 5/2010 | Hyde et al. | |
| 8,022,370 B2 | 9/2011 | Hyde et al. | |
| 8,094,023 B1 | 1/2012 | El-Kady et al. | |
| 8,222,793 B2 | 7/2012 | Wu et al. | |
| 8,558,189 B2 | 10/2013 | Hyde et al. | |
| 8,596,410 B2 | 12/2013 | Deymier et al. | |
| 2002/0093115 A1* | 7/2002 | Jang | B29C 64/165 264/113 |
| 2013/0134637 A1* | 5/2013 | Wiesner | B29C 67/0077 264/497 |
| 2013/0255738 A1 | 10/2013 | Mitrovic et al. | |
| 2015/0309473 A1* | 10/2015 | Spadaccini | G03H 1/2294 359/3 |
| 2016/0033857 A1* | 2/2016 | Son | G03F 1/26 430/5 |
| 2017/0266727 A1* | 9/2017 | Nishino | B22F 3/1055 |

OTHER PUBLICATIONS

Baac et al. Carbon-Nanotube Optoacoustic Lens for Focused Ultrasound Generation and High-Precision Targeted Therapy. Scientific Reports. http://www.nature.com/srep/2012/121218/srep00989/fullisrep00989.html. Dec. 18, 2012.
Caleap et al. PNAS: Acoustically trapped colloidal crystals that are reconfigurable in real time. vol. 111, No. 17; Apr. 29, 2014.
Georgia Insitute of Technology. "Fantastic phonons: Blocking sound, channeling heat with 'unprecedented precision'." ScienceDaily. ScienceDaily, Nov. 13, 2013.
Journal of Vibration and Acoustics: Special Issue on Dynamics of Phononic Materials and Structures. vol. 135, Issue 4; Jun. 6, 2013.
Laude et al. "Phononic Crystals." http://www.femto-st.fr/en/Popularization/An-introduction-to-phononic-crystals.
Maldovan, Sound and heat revolutionsin phononics. Nature: 503, 209-217. Nov. 17, 2013.
Massachusetts Institute of Technology. "How to treat heat like light: New approach using nanoparticle alloys allows heat to be focused or reflected just like electromagnetic waves." ScienceDaily. ScienceDaily, Jan. 11, 2013.
Nanotechnology/Nanophysics. Micro-manufacturing breakthrough is wired for sound. http://m.phys.org/news/2014-06-micro-manufacturing-breakthrough-wired.html. Jun. 25, 2014.
Nianbei et al. Colloquium: Phononics: Manipulating heat flow with electronic analogs and beyond. phylibw@nus.edu.sg. Mar. 5, 2012.
Phys Org. "Super-fine sound beam could one day be an invisible scaalpel". http://phys.org/news/2012-12-super-fine-day-invisible-scalpel.html. Dec. 19, 2012.
Physics World: Sound ideas. Dec. 2005.
Purdue University. "Research could bring new devices that control heat flow." ScienceDaily. ScienceDaily, Jan. 28, 2014.
Rice University. "Light and sound fire scientists' imaginations." ScienceDaily. ScienceDaily, Dec. 12, 2013.
Sanchez-Dehesa, Phononic Crystals: Toward the Full Control of Elastic Waves propagation (powerpoint presentation).
Science & Technology. Three-dimensional Non-contact Manipulation by Opposed Ultrasound Phased Arrays. https://www.youtube.com/watch?v=xUq0kT9a8bg. Dec. 13, 2013.
Vreeman. "A breakthrough in medical acoustics". Phys Org. http://phys.org/news/2014-01-breakthrough-medical-acoustics.html. Jan. 27, 2014.
Yarris. Manipulating and detecting ultrahigh frequency sound waves. Phys Org. http://phys.org/news/2014-06- ultrahigh-frequency.html. Jun. 11, 2014.
Yirka, Research build fully mechanical phonon laser. Http://phys.org/news/2013-03-fully-mechanical-phonon-laser.html. Mar. 19, 2013.
Zyga, Scientist exam possibility of a phonon laser, or 'phaser'. http://phys.org/news203058163.html. Sep. 7, 2010.
3ders. Ultrasonic 3D printing uses sound to merge layers & embed electronics in metal. http://www.3ders.org/articles/20140818-ultrasonic-3d-printing-uses-sound-to-merge-layers-embed-electronics-in-metal.html. Aug. 18, 2014.
See it, Touch it, feel it: Researchers use Ultrasound to Make Invisible 3-D Haptic Shape that can be Seen and Felt, ScienceDaily, Dec. 2, 2014, pp. 1-5, Published by University of Bristol, https://www.sciencedaily.com/releases/2014/12/141202123846.htm?keywords=Big%20Spread%20Seen.
Shen, Chen et al., Anisotropic Complementary Acoustic Metamaterial for Canceling out Aberrating Layers, Nov. 19, 2014, pp. 041033-1-041033-7, Published by American Physical Society.
An Optomechanical Crystal to Study Interactions Among Colocalized Photons and Phonons, PHYS ORG, Jul. 21, 2014, pp. 1-3, Published by Catalan Institute of Nanoscience and Nanotechnology, https://phys.org/news/2014-07-optomechanical-crystal-interactions-colocalized-photons.html.
Pennec, Yan et al., Two-Dimensional Phononic Crystals: Examples and Applications, Elsevier, Surface Science Reports, vol. 65, Issue 8, Aug. 31, 2010, pp. 229-291, www.u.arizona.edu/~deymier/deymier_group/refs/phonon11_review.pdf.
Baumgartl, Jorg et al., Tuning Phonon Spectra of Two-Dimensional Colloidal Crystals, Accessed Mar. 1, 2014, pp. 1-15, Universität Stuttgart, 2. Physikalisches Institut, Pfaffenwaldring 57, D-70569 Stuttgart, Germany.
First Phononic Crystal that can be Altered in Real Time, PHYS ORG, Mar. 31, 2014, pp. 1-4, Published by University of Bristol, https://phys.org/news/2014-03-phononic-crystal-real.html.
Crystals Ripple in Response to Light: First Propagating Surface Phonon Polaritons in a Van Der Waals Crystal, PHYS ORG, Mar. 6, 2014, pp. 1-4, Published by University of California—San Diego, https://phys.org/news/2014-03-crystals-ripple-response-propagating-surface.html.
Scientists Twist Sound with Metamaterials, PHYS ORG, Feb. 25, 2014, pp. 1-3, Published by American Institute of Physics, https://phys.org/news/2014-02-scientists-metamaterials.html#nRIv.
Yarris, Lynn, Crossover Sound: Unambiguous Evidence for Coherent Phonons in Superlattices, PHYS ORG, Feb. 5, 2014, pp. 1-4, Published by Lawrence Berkeley National Laboratory, https://phys.org/news/2014-02-crossover-unambiguous-evidence-coherent-phonons.html.
Engineers Build First Nonreciprocal Acoustic Circulator: A One-Way Sound Device, PHYS ORG, Jan. 30, 2014, pp. 1-4, Published by University of Texas at Austin, https://phys.org/news/2014-01-nonreciprocal-acoustic-circulator-one-way-device.html#nRIv.
Zyga, Lisa, Acoustic Lens Generates Tunable 'Sound Bullets' for Ultrasound Applications, PHYS ORG, Jan. 17, 2014, pp. 1-4,

(56) References Cited

OTHER PUBLICATIONS

Published by Phys.org, https://phys.org/news/2014-01-acoustic-lens-tunable-bullets-ultrasound.html#nRIv.
Lawall, John, Controllable Mode Competition in a Phonon Laser, PHYS ORG, Nov. 20, 2013, pp. 1-5, Published by the National Institute of Standards and Technology, https://phys.org/news/2013-11-mode-competition-phonon-laser.html.
Sound Bullets in Water, PHYS ORG, Nov. 19, 2012, pp. 1-3, Published by the American Institute of Physics, https://phys.org/news/2012-11-bullets.html#nRIv.
New Metamaterials Device Focuses Sound Waves like a Camera Lens, PHYS ORG, Aug. 9, 2012, pp. 1-3, Published by Pennsylvania State University, https://phys.org/news/2012-08-metamaterials-device-focuses-camera-lens.html#nRIv.
One-Way Transmission System for Sound Waves, PHYS ORG, Jul. 26, 2011, pp. 1-4, Published by California Institute of Technology, https://phys.org/news/2011-07-one-way-transmission.html#nRIv.
Zyga Lisa, Coke Cans Focus Sound Waves Beyond the Diffraction Limit, PHYS ORG, Jul. 12, 2011, pp. 1-7, https://phys.org/news/2011-07-coke-cans-focus-diffraction-limit.html#nRIv.
Chandler, David L., Explained: Phonons, PHYS ORG, Jul. 8, 2010, pp. 1-4, Published by Massachusetts Institute of Technology, https://phys.org/news/2010-07-phonons.html.
Chandler, David L., Taming the Wild Phonon, PHYS ORG, Mar. 22, 2010, pp. 1-5, Published by Massachusetts Institute of Technology, https://phys.org/news/2010-03-wild-phonon.html.
Scientists First to Trap Light and Sound Vibrations Together in Nanocrystal, PHYS ORG, Oct. 26, 2009, pp. 1-5, Physorg.com, https://phys.org/news/2009-10-scientists-vibrations-nanocrystal.html#nRIv.
Zyga Lisa, 'Phononic Computer' Could Process Information with Heat, PHYS ORG, Nov. 2, 2007, pp. 1-5, Published by Phys.org, https://phys.org/news/2007-11-phononic.html.

'Phonon Hall Effect' Observed, PHYS ORG, Oct. 23, 2005, pp. 1-3, Published by Phys.org, https://phys.org/news/2005-10-phonon-hall-effect.html.
PhysLink.com, "Physics and Astronomy Online," http://www.physlink.com/education/askexperts/ae532.cfm.
David L. Chandler, Massachusetts Institute of Technology, "How to Treat Heat Like Light: New Approach Using Nanoparticle Alloys Allows Heat to Be Focused or Reflected Just Like Electromagnetic Waves," Science Daily, https://www.sciencedaily.com/releases/2013/01/130111092719.htm, Jan. 11, 2013.
Francisco R. Villatoro, The Science of the Mula Francis; "Phononic devices for sound and heat control;" https://translate.google.com/translate?sl=auto&tl=en&js=y&prev=_t&hl=en&ie=UTF-8&u=http%3A%2F%2Ffrancis.naukas.com%2F2013%2F11%2F20%2Ffonones%2F&edit-text=&act=url; Nov. 21, 2013.
Yoichi Ochiai et al.; "Three-Dimensional Mid-Air Acoustic Manipulation [Acoustic Levitation];" https://www.youtube.com/watch?v=MY4jY901az4; Jul. 23, 2014.
CEM Lectures, Lecture_17_EM21; "Synthesizing Geometries for 21st Century Electromagnetics, Holographic Lithography"; YouTube (211673) CEM Lectures, https://www.youtube.com/watch?v=kPbEuGoMPfw, Published on Mar. 4, 2014.
University of Illinois at Urbana-Champaign; "High-performance 3-D microbattery suitable for large-scale on-chip integration;" http://phys.org/news/2015-05-high-performance-d-microbattery-suitable-largescale; html. Technology/Engineering, May 11, 2015.
3ders: "Lithuania-based Neurotechnology developing new 3D printing process that uses ultrasonic waves". http://www.3ders.org/articles/20170626-latvia-based-neurotechnology-developing-new-3d-printing-process-that-uses-ultrasonic-waves.html. Jun. 26, 2017.

\* cited by examiner

PHONON GENERATION IN BULK MATERIAL FOR MANUFACTURING

BACKGROUND

The present techniques relate to the field of methods for producing articles of manufacture, such as additive manufacturing methods.

This section is intended to introduce the reader to aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many of the products and goods that we use today, from simple to complex, are ultimately produced from basic materials such as polymers, ceramics, metals, and the like. Even certain advanced materials developed through cutting edge research include specific forms of these materials. Currently, there are a number of ways to use these different types of materials to produce useful items. As an example, polyolefins, a general class of polymers, are used for retail and pharmaceutical packaging (such as display bags, bottles, and medication containers), food and beverage packaging (such as juice and soda bottles), household and industrial containers (such as pails, drums and boxes), household items (such as appliances, furniture, carpeting, and toys), automobile components, fluid, gas and electrical conduction products (such as cable wrap, pipes, and conduits), and various other industrial and consumer products.

As another example, ceramics and metals may be, as appropriate, brazed, drawn, melted, pressed, soldered, sintered, welded, vapor deposited, and so forth, using certain specialized techniques and equipment to produce different types of metallic or ceramic items. Such ceramic or metallic items may range from simple articles such as floor tiles or conductive wires to more advanced articles of manufacture such as semiconductor devices.

In the examples set forth above, consumer products are produced on an industrial scale using manufacturing systems having specialized equipment configured to mass produce the products. For example, a mold may be filled with molten polymer to produce cups, a blow molding device may be used to produce bottles for drinks, and specific types of dies may be used to draw wire using molten or softened metals. Unfortunately, the specialized equipment that is used to produce these articles of manufacture on a large scale generally represent a very large capital investment on the part of the manufacturer. Furthermore, the cost associated with producing articles of manufacture does not end at the production site. Rather, such articles must be packaged and transported to a customer, which may use the articles as-is, or may subject them to further manufacturing processes.

In settings where mass production is not necessarily an issue, other types of equipment may use one or a combination of the materials noted above to produce specific items, such as prototypes. As an example, certain manufacturing systems may produce such items using a process that involves depositing a manufacturing material on a substrate, and causing the manufacturing material to combine with the substrate in a layer-by-layer process. The substrate may be the same as or different than the manufacturing material. Such a process may be best analogized to printing, where a device may be used in a similar manner to a print head by concurrently delivering a small amount of the material onto a substrate, and causing the small amount of material to combine with the substrate by providing sufficient energy to the material to cause it to melt, react, or the like. These techniques are commonly referred to as "3D printing."

While capable of producing three-dimensional constructs, 3D printing processes generally take several hours to complete. For example, the print head must print each layer of the article in a repeating process in which one layer is printed on top of another, and so on, as different portions of the article are laid on top of one another. Accordingly, while capable of producing unique items, such techniques do not generally have the capability to meet the requirements of settings in which an item may be desired within a few minutes, rather than a few hours. This relatively low throughput has limited the acceptance of 3D printing as a viable commercial technique for producing consumer goods.

In view of the present limitations associated with the current state of the manufacturing methods noted above, it is now recognized that it may be desirable to design systems that are capable of producing different types of articles of manufacture, but in a more expedient manner. Specifically, it is now recognized that it may be desirable to enable individual articles of manufacture to be designed in a similar manner to 3D printing while forming the articles with the speed associated with manufacturing devices used on a commercial scale.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

Figure 1:
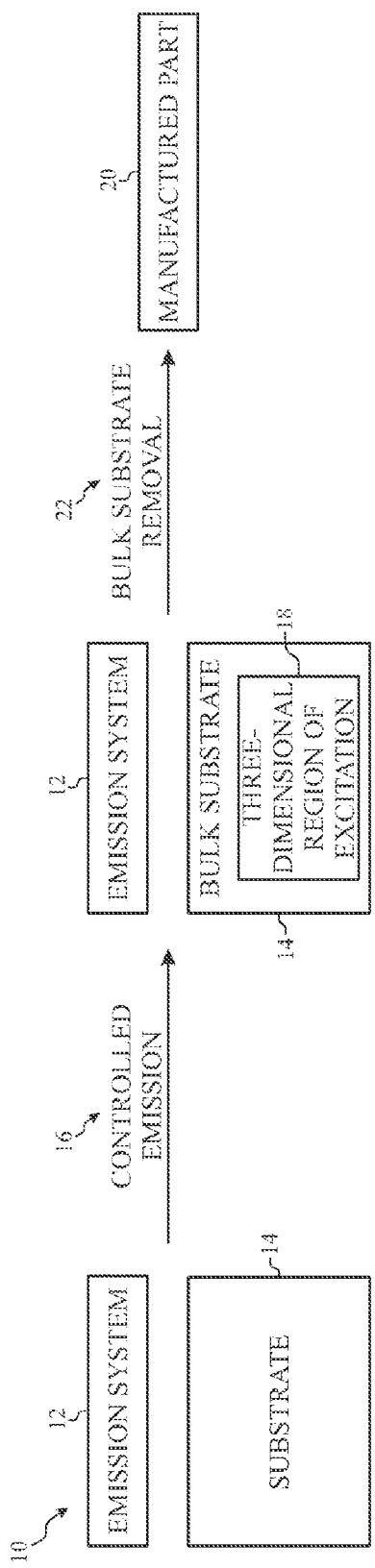
FIG. 1 is a schematic representation of an embodiment of a process for producing an article of manufacture using controlled emissions to generate patterns of excitation within a substrate, the patterns of excitation corresponding to a geometry of the article of manufacture.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

As set forth above, traditional manufacturing techniques must often balance production throughput with design flexibility. For example, while commercial production facilities are generally capable of producing a large quantity of a particular article of manufacture in a relatively short amount of time, the equipment needed for such high throughput is often costly and not easily replaced. This usually means that the equipment located at a particular site is dedicated to producing specific products, with little variability. In fact, variability is minimized as a design parameter of many commercial production facilities.

On the other hand, manufacturing systems with higher degrees of flexibility in product design, such as additive manufacturing systems, must often balance such design flexibility with throughput. In typical additive manufacturing systems, for example, articles of manufacture are produced by a process in which each layer of the article is printed using a print head, which may deliver a combination of the base material of the article as well as certain types of emissions (e.g., infrasonic, sonic, ultrasonic, hypersonic, optical, electron beam, heat) to the deposited layer to enable the layer to combine with some underlying substrate. Again, this generally results in each article of manufacture taking an amount of time for production that is not commercially feasible, except for very specific items that are not generally accessible to the average consumer (e.g., due to cost).

The present disclosure addresses these and other drawbacks of typical manufacturing systems by using particular types of sound, light, and/or heat emission to "write" an article of manufacture into a bulk substrate, such as a bed of granules or some other collection of a material. For example, the sound, light, and/or heat emissions may be used to generate excitations in the bulk substrate, where the excitations are focused to well-defined geometries within the bulk substrate so as to form all or a part of an article of manufacture.

More specifically, present embodiments are directed toward manufacturing systems and methods that utilize projected emissions to form articles of manufacture in place, without requiring traditional layer-by-layer printing as is often the case in traditional manufacturing techniques. For example, in one aspect of the present disclosure, embodiments of a manufacturing system may utilize certain types of emissions directed toward a solid material to cause vibration and heating. The vibration and heating may be caused by emissions specifically tuned to the particular solid material being used for manufacture, where the emissions interact with the solid material to cause, for example, phonon generation within the individual granules of material. In some embodiments, phonon propagation may also occur within granules and between granules of material. The emissions may be projected toward the solid material from one direction, or from multiple directions, and may be optical emissions, acoustic emissions, or a combination thereof. Indeed, certain embodiments that utilize acoustic emissions may utilize the mechanical wave properties of sound to produce localized areas of pressure and/or heating to form specific regions of an article of manufacture. In still further embodiments, acoustic, optical, or similar emissions may be used to produce acoustic, optical, and/or thermal phonon generation and propagation. In accordance with present embodiments, certain emissions are controlled to cause an atomic lattice of portions of a bulk material to resonate at a frequency sufficient to cause the bulk material to undergo a transformation to produce an article of manufacture (e.g., by controlling phonon generation and/or propagation).

In another aspect of the present disclosure, embodiments of a manufacturing system may utilize interfering optical emissions to impart sufficient energy to a bulk substrate to cause certain regions of the substrate to undergo optically-initiated chemical reactions such as curing, polymerization, or the like. Such embodiments may be used alone or in combination with other approaches described herein, such as those using acoustic emissions.

In yet a further aspect of the present disclosure, embodiments of the manufacturing system may employ a metamaterial configured to act as an acoustic and/or optical waveguide so that specific portions (e.g., focal regions) of a bulk substrate can be addressed individually (e.g., selectively excited). This directed excitation may enable all or a portion of an article of manufacture to be written into the bulk substrate. The metamaterials may be acoustic metamaterials that act as a phononic crystal, which may only enable certain wavelengths to pass therethrough. In this way, such acoustic metamaterials may be used to form masks for sound waves so that certain portions of a bulk substrate may be excited. Additionally or alternatively, the metamaterial may be present as a liquid crystalline material (e.g., as in a liquid crystal display, LCD), where the "pixels" produced in the display may serve to guide, direct, block, or generally act as a gate for emissions through the display (e.g., template, mask) and into the bulk material. Indeed, any of the embodiments disclosed herein in which a dynamic template is utilized should be considered to disclose the use of one or more screens each having sections of adjustable or non-adjustable material that can be individually addressed (e.g., programmed) to be open, closed, focused, and so forth, so that one or more emitters can be used to generate focused energy at a point or region inside of a build chamber.

It is presently contemplated that in accordance with the present disclosure, manufacturing systems can be designed that are capable of generating articles of manufacture having a wide variety of outer geometries, using virtually any type of material. For example, manufacturing systems using the techniques disclosed herein may be capable of producing articles ranging in complexity from food and beverage containers to high technology prototypes, including food preparation and cooking (e.g., using emissions directed toward edible material).

Further, because the techniques disclosed herein may be implemented on different scales, it is also contemplated that manufacturing systems in accordance with present embodiments may be used by individual consumers, small businesses, and the like. In this way, rather than purchasing individual articles of manufacture from commercial suppliers, warehouses, etc., a consumer may purchase a bulk of base material that can be used to construct articles of manufacture on an as-needed basis. Indeed, it may be possible to perform on-site production of items in their intended environment, thereby potentially reducing the costs associated with item packaging, shipment, warehouse inventory, etc. As one example, it may be possible to produce playground equipment from polymer pellets, granules, and/or powder at a playground site, to produce vehicle parts at a vehicle construction site, or even to enable the average consumer to produce their own household items from polymers, metals, ceramics, sand, etc.

In a general sense, the present disclosure enables the manufacture of individually-designed items from a bulk material, which may be referred to as a bulk substrate, using emissions directed toward the bulk material in a controlled manner. The emissions may cause the bulk material to combine in a manner consistent with its chemical and physical characteristics, depending on the type of emissions utilized. To help explain, referring initially to FIG. 1, a schematic representation of a process 10 is shown, the process 10 being representative of the manner in which an additive manufacturing system may produce an article of manufacture using focused emissions (e.g., to cause phonon generation, phonon propagation, photocatalysis, sintering, melting). As depicted, the process 10 may utilize an emission system 12, which is generally configured to direct emissions toward a bulk substrate 14 in a controlled manner to cause optically, thermally, vibrationally, or acoustically-driven processes, or any combination thereof, to occur in the substrate 14. In embodiments where the emission system 12 causes phonon generation/propagation in the bulk substrate 14 to facilitate desired product formation, it may be referred to as a phonon generation system. The term "bulk substrate" is used herein to include granular substrates, layered substrates, and the like, that may be subject to the chemical and/or physical transformations described herein.

Generally, the emission system 12 may include one or more emission devices configured to emit energy (e.g., optical, vibrational, acoustic, thermal) capable of interacting with one or more materials of the bulk substrate 14 (e.g., so as to cause vibration and/or heating in the materials), and/or one or more features of a focusing system configured to adjust (e.g., amplify and/or transduce emissions into emissions of alternative frequency and/or wavelength). The emission system 12 may also include one or more control devices, for example, a single or distributed control system, configured to coordinate emission by the emission devices as well as various other devices of the system 12. As discussed in further detail below, the emission system 12 may include systems and/or devices configured to focus one or more beams of emitted energy onto a portion of the substrate 14, rather than all of the substrate 14. The system 12 may, additionally or alternatively, include features configured to constrain the emissions to a portion of the substrate 14.

The bulk substrate 14 may include any one or a combination of materials capable of undergoing a physical and/or chemical change as a result of interactions with the emissions generated by the system 12. As one example, materials may be referred to as "phonon-reactive" materials when phonons generated/propagated in the material are capable of causing a sufficient amount of heat and/or vibration to effect product formation. By way of another example, such materials may include photo reactive materials, for example photocatalytic resins, materials that melt depending on a particular vibrational frequency, or may include materials capable of being sintered based on vibration and heat (e.g., metals, ceramics). However, the present disclosure should not be considered as being limited to these particular types of materials, as they are presented for illustrative purposes only. As more specific examples, the bulk substrate 14 may include a metal, a ceramic (e.g., metal oxides, semi-metal oxides), clay, sand, glass, a polymer resin such as a polyolefin resin (e.g., polyethylene, polypropylene), a polyvinylarene resin (e.g., polystyrene), an elastomer (e.g., polydimethylsiloxane (PDMS), polybutadiene), polyphenylenesulfide (PPS), and so forth.

The substrate 14 may be present in a variety of morphologies, and may be dry, in a slurry or suspension, or dissolved in solution. As an example, when the substrate 14 is dry, the material may be present as granules, which is intended to encompass powder, pellets, flakes, or any other dry morphology. In embodiments where the material of the substrate 14 is present in a solution, the material may be a solute of the solution, which may enable photocatalytic or other optically-driven processes (e.g., heating) to be used in accordance with the present disclosure.

To enable accumulation of the bulk material of the substrate 14 in a manner that facilitates the processes described herein, the bulk material may be positioned in a chamber or housing. As discussed in detail below, such features may be referred to as a build chamber, which may be coupled to various systems configured to fill the chamber, drain the chamber, and enable sufficient transmittance of the device emission by the emission system 12 to interact with the material.

Moving from left to right in FIG. 1, the process 10 includes a step of directing controlled emissions (step 16) toward the substrate 14, which may result in phonon generation and/or propagation, or some other controlled excitation of the substrate 14. For example, during phonon generation/propagation, one or more emission devices of the emission system 12 may emit some type of energy that causes vibration in certain areas of the bulk material of the substrate 14. In a general sense, the phonons can be thermal, optical, acoustic, or various combinations thereof, depending on the interaction between the emissions and the material. As is understood in the art, thermal phonons generally correspond to random vibrations in a lattice structure of atoms or molecules, acoustic phonons generally correspond to coherent wave-like vibrations in the lattice structure, and optical phonons generally correspond to vibrations where atoms of a first type move in a first direction, and atoms of a second type move in a second, opposite direction. The sum of these phonons in a lattice structure contributes to the overall thermodynamics of the lattice. In accordance with an embodiment of the present disclosure, these phonons may be individually or collectively manipulated to cause vibration and/or heating in the bulk substrate 14 for manufacturing.

As shown, the result of the emission step 16 is that a region having a pattern of excitation 18 in the substrate 14, such as a focal region of the emission devices of the emission system 12, undergoes a transition from initial state to state in which one or more materials (e.g. one or more atoms) are excited. That is, the device emission may cause the materials in the region 18 to undergo a transition from a ground state or some other state to an excited state, and the excited state results in, e.g., phonon generation through a lattice of the material. Alternatively, the controlled emission in accordance with step 16 may be acoustic emissions that cause wave propagation through the bulk substrate 14 and to a focal point or region. At the focal point or region, in certain embodiments, this may be considered to be a collective excitation of molecules or atoms, resulting in the propagation of a wave through the lattice of molecules or atoms, where the wave may have certain quantized properties that can be utilized to cause the chemical and/or physical change utilized herein to produce articles of manufacture. The three-dimensional excitation (e.g., excitation along a length, width, and depth) may correspond to a desired pattern corresponding to all or a part (e.g., less than all sides, a cross-section) of a desired product.

After emission in accordance with step 16 is performed for some amount of time, the emission process may cease. For example, this may represent no further excitation within the bulk substrate 14. After the excitation period has ended, a manufacture part 20 may be produced.

The manufactured part 20 may be isolated by a process denoted in FIG. 1 as bulk substrate removal (step 22). For example, bulk substrate removal in accordance with step 22 may include draining a solution of the bulk substrate, powder removal, pellet removal, flake removal, or the like. Generally, it should be appreciated that the acts in accordance with step 22 result in isolation of the manufacture part 20.

While the embodiment discussed above with respect to FIG. 1 may be applied to a variety of manufacturing techniques, the foregoing discussion has been primarily directed to additive manufacturing. However, it should be noted that subtractive manufacturing techniques are also within the scope of the present disclosure. For example, in FIG. 2, an embodiment of a process 30 of subtractive manufacturing is schematically depicted. The process 30 may utilize an embodiment of the emission system 12 that is similar to the system discussed above with respect to FIG. 1, except that it may be utilized or may utilize different energies, frequencies, intensities, or other emission parameters, sufficient to cause cleavage of one portion of the substrate from another.

Specifically, the process 30 may use the emission system 12 to refine a rough manufactured part 32. The rough manufactured part 32 may generally include any solid piece of material capable of interacting with emissions from the emission system 12. As an example, the rough manufactured part 32 may include a block of polymer resin, a ceramic block, or a slightly more refined article of manufacture, such as a rough part formed using certain additive manufacturing techniques. For example, the additive manufacturing techniques may include ultrasound additive manufacturing, light based additive manufacturing, and the like, where layers of the substrate are consecutively positioned on one another to produce the rough manufactured part 32. Thus, the process 30 differs from such techniques at least in that rather than building up a part, essentially adding pieces of the part together, the process 30 uses emissions sufficient to cause portions of the part 32 to be removed. As shown, the process 30 uses a similar step as set forth above with respect FIG. 1 in directing controlled emissions toward the substrate 14 (step 16).

Figure 2:
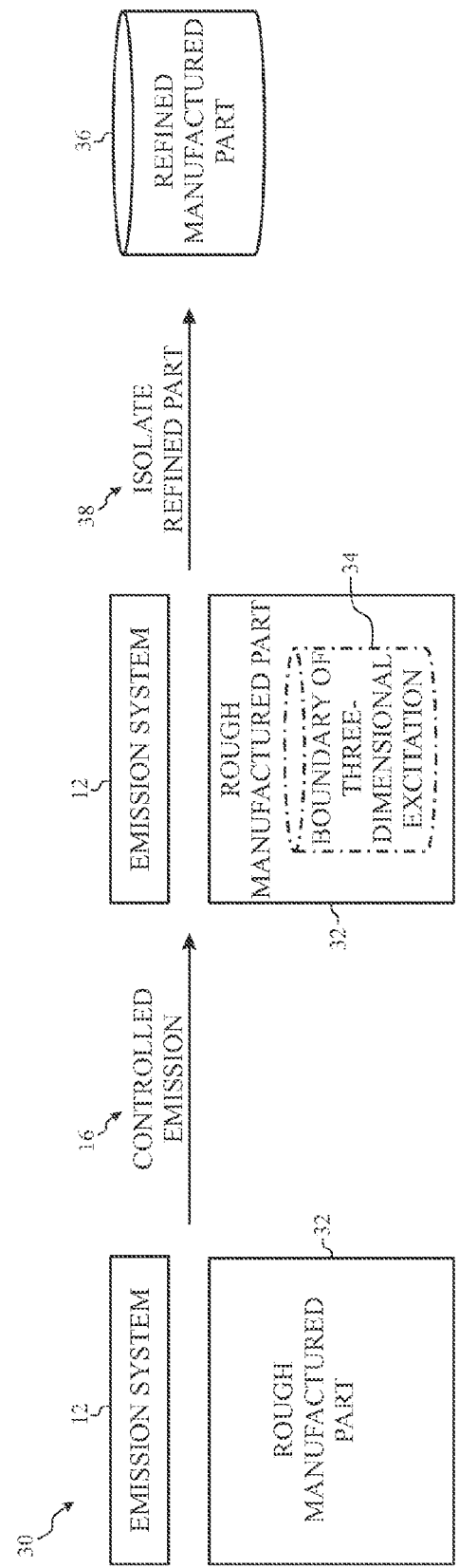
FIG. 2 is schematic representation of an embodiment of a process for producing an article of manufacture using controlled emissions to generate patterns of excitation within a rough manufactured part, the patterns of excitation corresponding to a geometry of the article of manufacture.

The emission in accordance with step 16 of FIG. 2, however, differs from that shown in FIG. 1 in that excitation occurs in an already manufactured part 32, and is used for material removal. In certain embodiments, the controlled excitation may cause vibration, shock, pressure etc., in the part 32 for the material removal. As depicted, the controlled excitation in accordance with step 16 generates a boundary 34 of excitation. The boundary 34 may define the shape, size, and overall geometry of a refined manufactured part 36. Indeed, after the controlled excitation is performed for a certain period of time, the refined manufactured part 36 is produced. The controlled excitation may, for example, result in vibrations (e.g., an adjustment in the frequency of atomic oscillation) in the base material sufficient to cause a removal of certain sections of the part 32 and create patterns (e.g., the boundary 34 of excitation) in the part 32. Such a process may also be used to create designs, indicia, and so forth, in the refined manufactured part 36.

Because the refined manufactured part 36 is produced from a solid bulk material, it may then be isolated (step 38)

by simply removing it from the remainder of the rough manufactured part 32. In certain embodiments, the scrap material left over from this process 30 may be utilized as a recycle feed for another process, such for extrusion, or for some other manufacturing technique.

Figure 3:
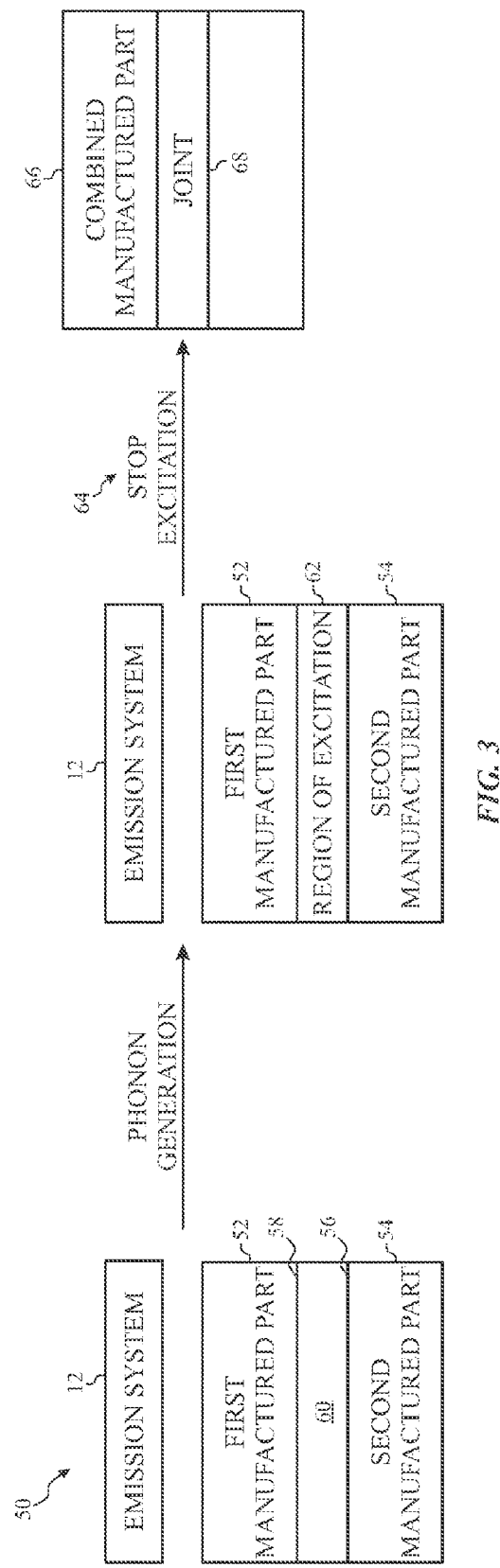
FIG. 3 is a schematic representation of an embodiment of a process for producing a combined article of manufacture using controlled emissions to generate a weld in overlapping individual parts.

While the foregoing described the present techniques in the context of additive and subtractive manufacturing techniques, it should be noted that the present disclosure may also be applicable to methods for combining separate parts to create various combined products. For example, as illustrated in FIG. 3, an embodiment of such a combination process 50 may include the use of the emission system 12 to combine a first manufactured part 52 and a second manufactured part 54 to produce an article of manufacture.

In a general sense, the first and second manufactured parts 52, 54 may be manufactured in the sense that they have been constructed from base materials, such as polymer resins, metals, ceramics, and so forth. The process to produce the first and second manufactured parts 52, 54 may have included extrusion, blow molding, sintering, molding, and so forth, and is not particularly limited. In accordance with the present disclosure, excited regions (e.g., regions of certain phonons) are generated in the first part 52, the second part 54, or combination of both. The excitation regions may be regions in which phonons are generated and/or propagated, the phonons having an energy sufficient to cause vibration and heating of the first and/or second parts 52, 54 so that they are coupled together via melting, sintering, or the like. Thus, the process 50 will generally include controlled emission (step 16) in accordance with the description set forth above with respect to FIGS. 1 and/or 2.

As shown, the first manufactured part 52 may have a first boundary 56 and the second manufactured part 54 may have a second boundary 58. The first and second boundaries 56, 58 may overlap to form a region of overlap 60, where the weld is to be formed. The region of overlap 60 need not be one in which the first boundary 56 and the second boundary 58 are in the illustrated relationship. Rather, the region of overlap 60 may simply be one in which the boundaries 56, 58 are placed in direct abutment with one another. However, to facilitate discussion, the present technique is described in the context of one of the first or second manufactured parts 52, 54 being placed over the other to form the region of overlap 60.

As shown, the emission system 12, upon performing the step of controlled emission 16, may produce a region having a pattern of excitation 62. The pattern of excitation 62 may or may not correspond to the size, shape, or other geometrical parameter, of the region of overlap 60. That is, although the region of overlap 60 may have a particular size and shape, the pattern of excitation 62 may only span a portion of the region of overlap 60, as it is presently contemplated that the first and second manufactured parts 52, 54 may be coupled to one another sufficiently by a geometry defined by the pattern of excitation 62. Alternatively, the pattern of excitation 62 may be dynamic, rather than static. That is, the pattern of excitation 62 may be a region where excitation occurs on a focused portion of the first and/or second manufactured parts 52, 54 and the region (e.g., focal region) may be moved during the process 50. In this regard, excitation may essentially be scanned over all or a portion of the region of overlap 60 to couple the first and second manufactured parts 52, 54 together. Once the excitation has ceased altogether in accordance with step 64, a combined manufactured part 66 may be formed, and may include a joint 68 where the two are coupled together. The joint 68 may be considered to generally include a region where the respective constituents of the first manufactured part 52 in the second manufactured part 54 have been subjected to sufficient amount of excitation (e.g., phonon generation) so as to melt, sinter, or otherwise combine in a manner such that they are coupled together in a substantially permanent fashion, or less permanent if so desired.

The process 50 may be used to produce a number of different articles of manufacture. As an example, the first and second manufactured parts 52, 54 may include separate portions of a beverage or food container, separate portions of a pipe, separate portions of an appliance, separate portions of playground equipment, and so forth. In these examples, the first and second manufactured parts 52, 54 may be combined to form a single beverage or food container, a single pipe, a single appliance, a single piece of playground equipment, and the like, using a single emission or a single set of overlapping emissions produced by the emission system 12.

Figure 4:
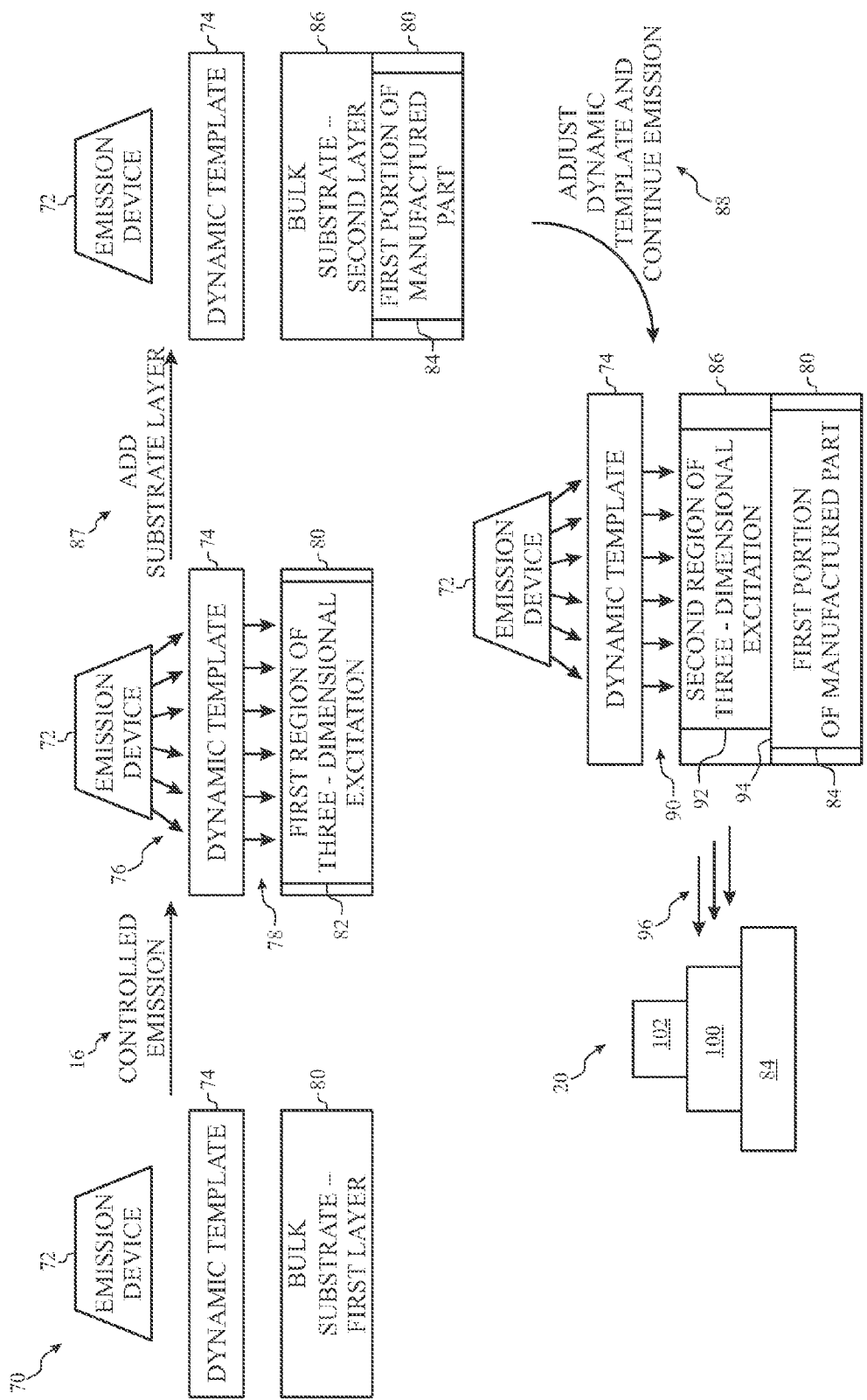
FIG. 4 is a diagram of an embodiment of a process for producing an article of manufacture using controlled emissions to generate patterns of excitation in assembled layers of a substrate, the patterns in the assembled layers corresponding to a geometry of the article of manufacture.
Figure 5:
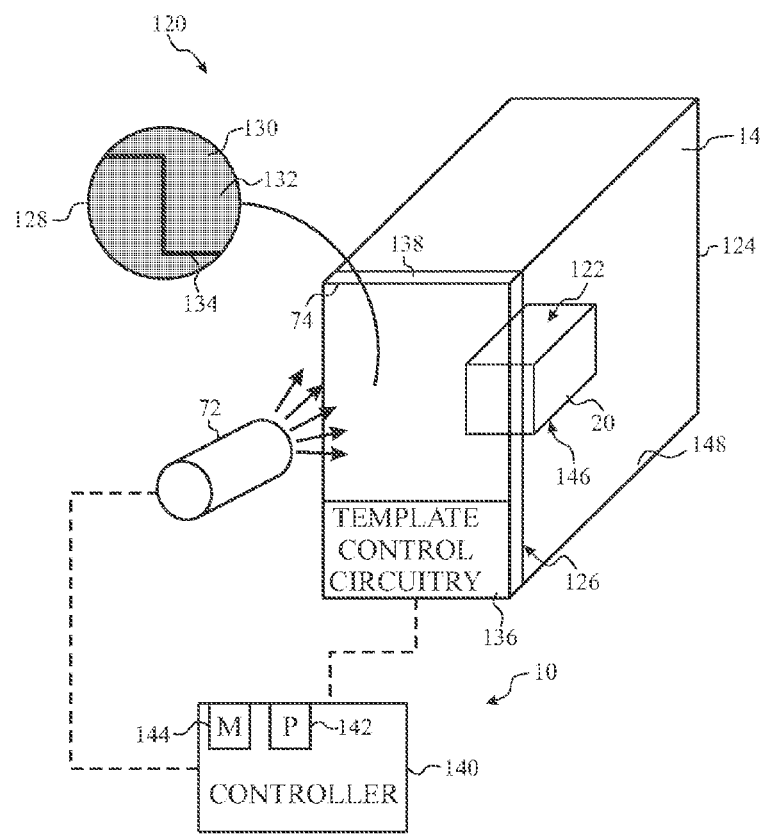
FIG. 5 is a perspective view of an embodiment of a manufacturing system having a dynamic template for directing controlled emissions from a single emission device toward a bulk substrate to generate patterns of excitation in the substrate, the patterns corresponding to a geometry of an article of manufacture produced by the excitation.
Figure 6:
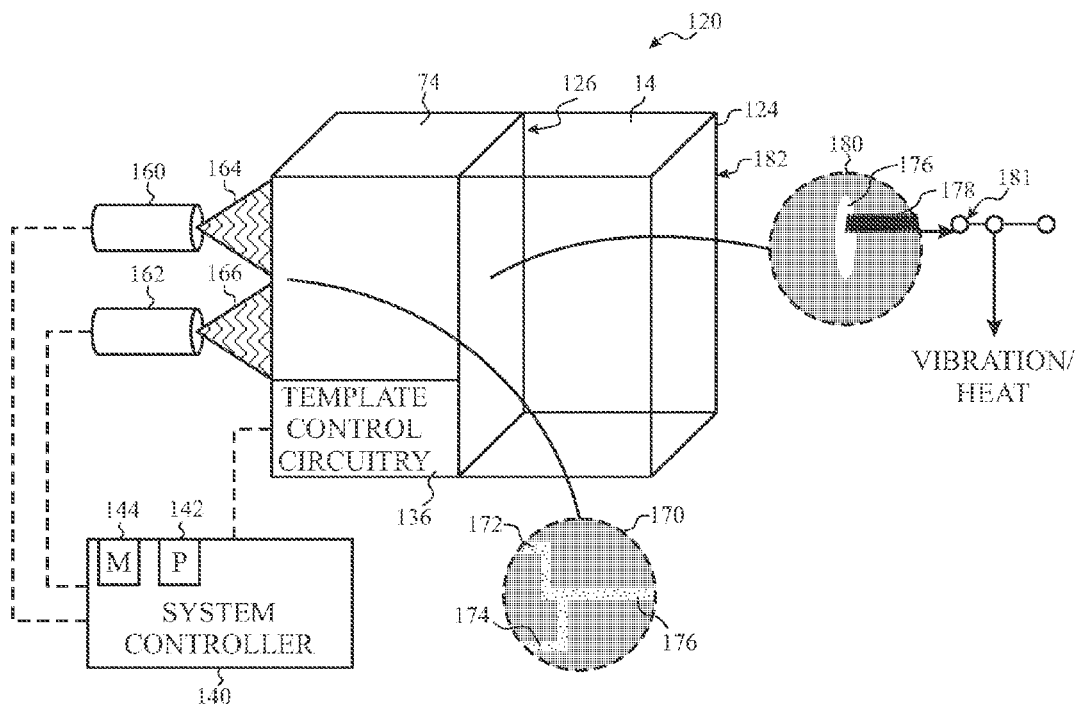
FIG. 6 is a perspective view of an embodiment of a manufacturing system having a dynamic template for directing controlled emissions from one or more emission devices toward a bulk substrate to generate patterns of excitation in the substrate, the patterns corresponding to a geometry of an article of manufacture produced by the excitation.

As may be appreciated from the foregoing, techniques in accordance with the present disclosure may produce various articles of manufacture using one or more emission devices that emit light, heat, sound, and so forth, toward one or more sides of the bulk substrate 14. In accordance with one aspect of the present disclosure, one or more emission devices may be controlled (e.g. by a controller) to direct emissions toward only one side of the bulk substrate 14. FIGS. 4-6, for instance, depict example embodiments where a dynamic template may be used to enable formation of all or portion of the article of manufacture 20 from a single side of the bulk substrate 14.

In particular, FIG. 4 schematically depicts a process flow 70 using a more particular embodiment of the emission system 12. The emission system 12 may be considered to include an emission device 72 which, as described in further detail with respect to subsequent illustrations, may be controlled in a number of ways. In accordance with present embodiments, the emission device 72 (and any of the other emission devices described herein) may be a source of optical emissions, a source of acoustic emissions, thermal emissions, electron beam emissions or, in other situations, may represent multiple emission devices configured to direct optical, acoustic, thermal, or a combination of such emissions toward the substrate 14. The description set forth above and below with respect to the emission device 72 may be considered to apply generally to any of the emission devices described herein, except as specifically noted.

In embodiments where the emission device 72 generates optical emissions, the emission device (or emission devices) may include a laser or other optical source (or combination of sources) of sufficient operating parameters to cause a desired process to occur in the bulk substrate 14. Non-limiting examples of such processes may include melting, photocatalytic reactions, curing, heat generation via vibration and/or thermal phonon generation/propagation, and the like.

In embodiments where the emission device 72 is configured to emit sound waves, the device may include any device capable of producing one or more tones at one or more desired frequencies, such as piezoceramic discs, speakers, and so forth. Further, the emission device 72 may be capable of being controlled to produce several frequencies at one or more phases. The desired frequencies of emission may include those that are capable of causing phonons to be generated and/or propagated in the bulk substrate 14. The phonons so generated may have desired characteristics so as to perform certain of the techniques described below. Desired properties of the acoustic emission, and the resulting phonons, may include a vibrational frequency capable of causing a sufficient amount of heat or pressure to be formed in a localized (e.g., focused) region of the bulk substrate 14. In certain embodiments, the emission device 72 may be a device that emits frequencies below traditional acoustic frequencies, and which may be amplified or otherwise interfered with to cause subsequent vibration in the bulk substrate 14 normally achieved using acoustic (or other) frequencies.

In still further embodiments, the emission device 72 may include all or a portion of an electron lasing system, sometimes referred to as a free-electron laser. In such embodiments, the emission device 72 may utilize electrons as a lasing medium. The electrons may be passed through a feature configured to interact with the electrons to cause acceleration and generation of other types of emission (e.g., optical, acoustic, microwave). An example of this would be synchrotron radiation, which includes optical emissions generated from accelerated electrons. The emissions may be directed to the build chamber 16 in a predetermined manner using, for example, certain beam steering features (e.g., electromagnetic devices), and/or various masking and templating features (e.g., of the emission system 12).

To enable emissions from the emission device 72 to be directed into the build chamber 16 in a predetermined manner, the depicted embodiment also includes a dynamic template 74. The dynamic template 74 may be considered to correspond to an acoustic and/or optical masking device, for example a device including one or more screens. The dynamic template 74, in a general sense, is configured to interact with an emission 76 of the emission device 72 and produce a focused or constrained emission 78 therefrom. While more specific examples of the dynamic template 74 are described in further detail below, it should be noted that the dynamic template 74 may include any suitable device that is capable of blocking emissions 76 from the emission device 72 in certain areas while also simultaneously enabling certain of the emissions 76 to pass therethrough in other areas, or minimizing or reducing formation of emissions. In addition, as defined herein, the dynamic template 74 will generally be configured to change the shape, size, and transmitting characteristics of these areas. In other words, the dynamic template 74 will generally be configured to change which regions of the template 74 perform blocking of the emissions 76 (or reducing the formation of the emissions 76) and which regions of the template 74 enable transmittance of the emissions 76 (or enabling the formation of the emissions 76) toward the bulk substrate 14.

The dynamic template 74 may, in certain embodiments, be considered to be a metamaterial, which includes a number of different materials having different transmittance and absorption properties with respect to the emissions 76. In accordance with present embodiments, the dynamic template 74 may include an acoustic metamaterial, which is a material designed to interact with acoustic emissions from the emission device 72 in a particular way. In accordance with other embodiments, the dynamic template 74 may include an optical metamaterial, which is a material designed to interact with optical emissions from the emission device 76 in a particular way. More specifically, the acoustic metamaterials of the dynamic template 74 may have physical features (e.g., inclusions) with a periodic spacing that allows only certain frequencies of sound to pass through the dynamic template 74. Generally, the periodic spacing will approximate the sound wavelengths and frequencies. A similar relationship exists for optical metamaterials and optical emissions. In certain embodiments, the dynamic template 74 may include a stack of screens, cards, or the like, having regions of different acoustic, electrical, optical, and/or thermal transmittance. The individual screens/cards in the stack may be moved relative to one another to cause passage of appropriate energy/emissions.

Generally, the dynamic template 74 will include at least two different constituent materials. Non-limiting examples of these materials include composite materials such as solid (e.g., metallic, ceramic, polymeric) inclusions disposed within a matrix, such as a liquid crystal matrix. In this way, the dynamic template 74 may be considered somewhat analogous (at least from the manner in which it operates) to a liquid crystal display. Further details relating to the dynamic template 74 are presented below with respect to FIG. 5. In some embodiments, the dynamic template 74 may act not only as a masking device, but also as a waveguide (for example a phonon waveguide), a phononic, or a phoxonic crystal. Therefore, the dynamic template 74 may be configured to direct light, heat, or sound waves, or any combination thereof, toward the bulk substrate 14 in a controlled manner. Further, depending on the nature of the emission 76, the particular technique utilized for producing the article of manufacture 20, and so forth, the dynamic template 74 may or may not be in contact with the substrate material used to produce the article 20.

Again, together, the emission device 72 and the dynamic template 74, along with any control, filtering, and/or transducing devices, operate to direct controlled emissions toward the bulk substrate 14. In the illustrated process 70 of FIG. 4, the controlled emissions 78 are directed toward layers of a bulk substrate so that an article of manufacture can be produced layer by layer. However, unlike traditional additive manufacturing techniques, the corresponding geometry formed in a single layer may be formed all at once. It should also be noted that, in accordance with certain embodiments and as described in further detail below, an entire part can be formed all at once, either in addition to defining geometries for individual layers or in lieu of such manufacturing approaches. In other words, different portions of an article may be formed using a single controlled emission step to produce complex shapes and patterns in each layer. For example, a single emission step may be used to produce a bottom of a water bottle or some other complex geometrical feature. Also, the layers need not be of a particular thickness, but can be thicker than layers typically obtained by, for example, sheet extrusion techniques. Thus, moving from left to right, the controlled emissions 78 are directed toward a first layer 80 of the bulk substrate upon performing controlled emission in accordance with step 16.

This controlled emission causes a first pattern of excitation 82, corresponding to a cross-section of a three-dimensional image of the article, to be produced in the first layer 80 of the bulk substrate. The first pattern of excitation 82 may be an optically-induced excitation or an acoustically-induced excitation, or both. In accordance with an embodiment, the first pattern of excitation 82 may cause vibrations sufficient to cause localized heating to write a cross-sectional geometry into the layer 80 all at once. The written cross-sectional geometry may correspond to a first portion 84 of the manufactured part 20. The first pattern of excitation 82 may have any size, shape, or other geometrical parameter desired. As will be appreciated from the discussion set forth below, there may be a number of ways to control these geometric parameters.

After generating the first portion 84, a new substrate layer (e.g., a second layer 86) may be added (step 87) on top of the first layer 80. One advantage associated with using a layer by layer approach, as shown, is that different materials can be incorporated into the manufactured article 20. Indeed, the second layer 86 may be the same or different from the first layer 80 in terms of morphology, size, material composition, and the like. As shown, the second layer 86 is substantially the same size as the first layer 80.

After the second substrate layer 86 is added, the process 70 may include an adjustment of the dynamic template 74, and continued controlled emission (step 88). For example, the emission device 72 may continue to provide emissions 76 toward the dynamic template 74. However, because the dynamic template 74 has been adjusted in accordance with step 88, the focused emissions directed toward the substrate may be considered to be a second focused emission 90 different from the focused emissions 78. For example, the dynamic template 74 may adjust a size and/or shape of certain regions that enable the emission 76 to pass through the template 74 while others block the emission 76. As shown, the result of such dynamic template adjustment and continued emission is that a second pattern of excitation 92 may be produced in the second layer 86. The second pattern of excitation 92 generally has a size and/or shape determined by the adjustment of the dynamic template 74, and may have a three-dimensional geometry approximating a cross-section of the article 20.

It should be noted that the continued emission in accordance with step 88 may be such that the second region of phonon generation 92 has sufficient energy or sufficient amount of excitation to cause the second region 92 to be coupled to the first portion of the manufactured part 84 by, for example, melting, sintering, curing, or the like. For example, in embodiments where both the first and second layers 80, 86 are polymeric, the second pattern of excitation 92 may have sufficient excitation to cause a portion of the second layer 86 to melt and seep into pores or other spaces at a boundary 94 between the first portion of the manufactured part 84 and the second region 92. Alternatively, in embodiments where both the first and second layers 80, 86 are ceramic or metallic, the second pattern of excitation 92 may have sufficient energy to cause a portion of the second layer 86 to melt, weld, sinter, and/or and seep into pores or other spaces at the boundary 94 between the first portion of the manufactured part 84 and the second region 92. Indeed, in one embodiment, the second pattern of excitation 92 may have sufficient energy to cause a metallurgical bond to be formed between the first portion of the manufactured part 84 and the second region 92.

As shown, the processes described above may be continued in a series of steps, denoted by arrows 96, to produce an embodiment of the manufactured part 20. The series of steps 96 may include the use of, for example, additional layers of the same or different materials and material morphologies, the same or different types of emission produced by the same or different emission devices, in the same or different patterns of masking using the same or different dynamic template. Therefore, what is ultimately produced as the article 20 in accordance with the process 70 of FIG. 4 may depend on the particular materials used, the number of layers, and so forth.

As shown, the embodiment of the manufactured part 20 may include a plurality of portions (including the first portion 84, a second portion 100 produced from the second region 92, and a third region 102 produced from at least one subsequent layer deposition and excitation step). The plurality of portions of the manufactured part 20 may all be coupled together using phonon generation, vibration, sintering, melting, or the like, in accordance with the present technique.

In accordance with the present embodiments, the different portions of the manufactured part 20 of FIG. 4 may generally each be produced from a layer, and may have a thickness that is determined based on the particular materials selected for manufacture. The thickness of each portion may also depend on the capabilities of the emission device 72, the type of emissions produced by the emission device 72, and the configuration of the dynamic template 74. As an example, certain materials may enable a standing vibrational wave to be produced (upon excitation) along certain distances, where the distance may correspond to the particular layer thickness employed and the nature of the material. Also, the emission device 72 may have certain capabilities, such as emission intensity, emission flux, as well as other emission constraints.

While the embodiment shown in FIG. 4 depicts the dynamic template 74 being used for layer by layer additive manufacturing, the present techniques are also applicable to other methods of additive (or subtractive) manufacturing. Referring now to FIG. 5, for example, present embodiments may also include an embodiment of a system 120 configured to produce the article of manufacture 20 without adding layers (or, in other words, in a single step). Further, in certain embodiments, the article of manufacture may be produced by causing three-dimensional excitation within the bulk substrate 14, where the three-dimensional excitation corresponds to all or a portion of a geometry 122 of the article 20.

As shown in the illustrated embodiment, the bulk substrate 14 used to produce the article of manufacture 20 may be positioned within a build chamber 124 configured to hold the bulk substrate 14 in a manner suited to the particular way in which the bulk substrate 14 is provided for the particular manufacturing technique. As an example, the bulk substrate 14 may be present as granules, such as a powder bed, a packed arrangement of pellets, or any similar solid morphology (e.g., powder, pellets, flakes, or the like). Alternatively, the bulk substrate 14 may be provided within the build chamber 124 as a solute in a solution, or a solid in a suspension or slurry. As discussed in further detail below, it is presently contemplated that certain embodiments of the present disclosure may enable the formation of the article 20 within solution in a manner that enables the article to be formed and precipitate out of the solution.

It should be noted that the embodiments depicted in FIGS. 1-4 are intended to include configurations in which one or more sides of the substrate (the bulk substrate 14) are subjected to emissions from one or more emission devices. In the embodiment depicted in FIG. 5, the dynamic template 74 is used in combination with one or more emission devices configured to subject the bulk substrate 14 to emissions from only one side of the build chamber 124. In one embodiment, the emission device 72 may include only one emission device, while in other embodiments, the emission device 72 may represent two, three, or more emission devices. In this regard, in one more particular embodiment, the emission device 72 (or devices) may be only optical devices configured to emit photons of sufficient energy to cause absorption by the bulk substrate 14 sufficient to cause heating, curing, photocatalytic reaction, or the like. In another more particular embodiment, the emission device 72 (or devices) may only include acoustic or sub-acoustic emission devices configured to emit sound waves or vibrational waves. The sound waves or vibrational waves, in some embodiments, may be amplified to produce a desired response in the bulk substrate 14 (e.g., vibration, pressure, shock) to cause sintering, melting, etc. In yet a further, more specific embodiment, the emission device 72 (or devices) may only include emission devices configured to cause heating in the bulk substrate 14. This may include, for example, photon absorption by the bulk substrate 14 and an associated rise in temperature sufficient to cause melting or sintering. In such embodiments, the dynamic template 74 may serve to focus a wide-band emission of the emission device 72 to cause heating, melting, sintering, etc., of a specific area of the bulk substrate 14.

Again, the dynamic template 74 may be provided in contact with either or both of the bulk substrate 14 or build chamber 124, or may be spaced apart from either or both. In the illustrated embodiment, the build chamber 124 is positioned in abutment against a first side 126 of the build chamber 124.

As noted above, the dynamic template 74 may include a combination of materials that enables a selective transmittance of emissions from the emission device 72 toward the bulk substrate 14. As shown in expanded section 128, the illustrated embodiment of the dynamic template 74 includes a matrix 130 and inclusions 132 disposed within the matrix 130. In accordance with one embodiment, the matrix may be transmittive with respect to one or more emissions from the emissions device 72, and the inclusions 132 may be opaque with respect to such emissions (so as to block the emissions from being transmitted toward the substrate 14). In one aspect, the inclusions 132 may have anisotropic transmittance, depending on their particular orientation within the matrix 130. In certain embodiments, for example, if the inclusions are nanomaterials (e.g., iron nanoparticles or nanotubes), the inclusions 132 may have anisotropic blocking and transmittance properties such that in one configuration the inclusions 132 block transmittance of the emissions 76, while in a second, different configuration, the inclusions 132 allow the device emissions to pass through the template 74. In alternative embodiments, the transmittive properties of the matrix 130 and the inclusions 132 may be reversed, such that the matrix 130 is opaque with respect to the emissions while the inclusions 132 are transmittive (e.g., always transmittive).

As also illustrated in the expanded portion 128, the inclusions 132 and/or the matrix 130 may be controlled in order to form a guide path 134. The guide path 134, in accordance with certain embodiments, may act as a waveguide so as to direct emissions from the emission device 72 in a controlled manner through the dynamic template 74. Such controlled transmittance of the emissions may enable the dynamic template 74 to direct emissions from the emission device 72 to a particular region of the bulk substrate 14 within the build chamber 124 (e.g., a focal region). The guide path 134 may include only the inclusions 132, only the matrix 130, or may include a combination of the matrix 130 in the inclusions 132. The particular material composition of the guide path 134 may depend on a particular transmittance properties of the matrix 130 and inclusions 132 with respect to the emissions from the emission device 72. For example, the guide path 134 may be controlled to produce an optical and/or acoustic metamaterial having wavelength-selective or frequency-selective transmittance properties. In such embodiments, the periodicity of the inclusions 132 may be controlled to correspond to the wavelength or frequencies desired for transmittance to the bulk substrate 14. Specifically, the inclusions 132 may be controlled to have a spatial periodicity corresponding to a desired bandgap in the waveforms.

By way of non-limiting example, the matrix may include diluents such as water, alcohols, organic liquids, and the like, or may include liquid crystal materials, such as those typically used in a liquid crystal display. The inclusions 132 may include, by way of non-limiting example, granules that are polymeric, ceramic, metallic, or the like. By way of further example, the inclusions 132 may include nanomaterials such as nanotubes, nanoparticles, nanospheres, or the like, including any one or a combination of carbon, boron, nitrogen, iron, copper, and so forth.

In accordance with an aspect of the present disclosure, the matrix 130, the inclusions 132, or a combination thereof, may be considered to constitute all or a portion of a movable material within the dynamic template 74. A movable material within the dynamic template 74 is intended to denote any material capable of being moved or otherwise controllably positioned or oriented by one or more control devices in communication with the dynamic template 74. As an example, the matrix 130 and the inclusions 132 may, together or separately, behave similar to a liquid crystal display, in which the matrix 130, the movable material 132, or both, are able to be positioned or oriented using electrical signals generated by a control device. An embodiment of such a control device is depicted in FIG. 5 as template control circuitry 136.

In embodiments where the matrix 130, the inclusions 132, or both, are addressable using electric signals, the template control circuitry 136 may include, among other things, one or more electronic control circuits capable of addressing subsets (e.g., pixels, voxels), of the dynamic template 74. In this way, the template control circuitry 136, using electrical signals, is configured to adjust patterns of the matrix 130 and inclusions 132 formed within the dynamic template 74 to control the transmittance of emissions from the emission device 72 therethrough. As one example, the template control circuitry 136 may include electronic circuits disposed around a periphery 138 of the dynamic template 74, or any other suitable arrangement of electronic circuits. The individual pixels or voxels, as noted above, may be used to pass, block, focus, and/or de-focus emissions therethrough.

Additionally or alternatively, the matrix 130, or the inclusions 132, or both, may be addressable using magnetism. For example, the template control circuitry 136 may include one or more magnetic elements configured to be controlled (e.g., energized) so as to produce controlled magnetic fields that are localized within certain areas of the dynamic template 74. Thus, the matrix 130 and the inclusions 132 may be addressable using magnetism and/or electricity to produce patterns within the dynamic template 74. The patterns may correspond to one or more guide paths as shown similar to the guide path 134 shown in the expanded region 128.

As also shown in the embodiment depicted in FIG. 5, the system 10 may include a controller (e.g., a system controller 140) configured to coordinate the operation of the dynamic template 74 via the template control circuitry 136 with operation of the one or more emission devices 72. Generally, the system controller 140 may include one or more processing devices 142 located in a single or distributed locations, and the processing devices 142 may be configured to execute instructions stored in non-transitory memory 144, where the instructions may include a variety of control operations that enable the system 10 to produce the article 20. In some embodiments, the system controller 140 may also include other control devices configured to facilitate operation of the emission devices 72, the dynamic template 74, positioning of the build chamber 124, and so forth. Such embodiments are described in further detail below.

In one particular embodiment, the system controller 140 may be configured to perform computer numerical code (CNC) control or the like, which includes automated processes configured to produce the article 20 according to a three-dimensional model of the article of manufacture 20 stored in non-transitory memory 144. As an example, based on the stored three-dimensional model, the system controller 140 may adjust the operation of the emission device 72, for example, by adjusting its position, emission intensity, emission flux, frequencies of emission, and so forth. In accordance with any of the embodiments described herein, the system controller 140 may also control the operation of the dynamic template 74 in combination with such control actions based on the stored three-dimensional model. By way of example, the system controller 140 may be configured to control an emission source (e.g., the emission device 72 and the dynamic template 74) to cause phonon generation in the base material according to the computer model.

By way of more specific but non-limiting example, the system controller 140 may adjust a penetration depth of emissions into the build chamber 124 (and therefore the bulk substrate 14). The system controller 140 may, additionally or alternatively, adjust an emission spectrum of the emission device 72. Such adjustments may be desirable in situations where the bulk substrate 14 may include more than one material, where the different materials may have different reactivities at different portions of the emission spectrum. Additionally or alternatively, such an adjustment may be desirable to change the manner in which emissions from the emission device 72 are transmitted through the dynamic template 74, for example to facilitate focusing of the emissions into different regions of the bulk substrate 14.

In adjusting one or more operational parameters of the dynamic template 74, the system controller 140 may adjust (e.g., via template control circuitry 136) a pattern or multiple patterns within the dynamic template 74 to adjust the section of the article of manufacture 20 being formed at that particular point during manufacturing. For example, emissions from the emission device 72 may be focused into regions to trace the geometry 122 of the article 20. Where the focused emissions are sufficient to cause vibrations, heating, or other processes (e.g., catalysis), this may correspond to "writing" the article 20 into the bulk substrate 14. Thus, during a manufacturing process, the controller 140 may cause adjustment in the pattern of the dynamic template 74 upon formation of a portion of the article 20, thereby forming a new pattern in the dynamic template 74 and an associated adjustment in the portion of the article 20 in which the emissions are focused. This may result in the formation of another portion of the article 20.

Additionally or alternatively, the system controller 140 may adjust a periodicity of the inclusions 132 (e.g., in a focusing region) so as to adjust which portions of the emission spectrum are transmitted through the dynamic template 74 (e.g., via the guide path 134). In this way, the dynamic template 74 may serve as a metamaterial, such as a phononic or photonic crystal. When the dynamic template serves as a phononic crystal, the inclusions 132 may be spaced at a periodicity that allows only certain frequencies of sound to be transmitted along the guide path 134 and toward the bulk substrate 14, as described above. Likewise, when serving as a photonic crystal, the inclusions 132 may be spaced at a periodicity that allows only certain optical wavelengths to pass therethrough. Furthermore, the dynamic template 74 may, in certain situations, serve as a phoxonic crystal, which would correspond to a combination of a phononic and photonic crystal that is configured or otherwise capable of controlling the optical and acoustic emissions directed to the bulk substrate 14. In this way, the dynamic template 74 may include periodicities (e.g., first and second periodicities) intended to control optical and acoustic wavelengths, respectively.

In one sequence of operation of the system 120, the system controller 140 may control operational parameters of both the emission device 72 and the template 74 to form different sections of the article of manufacture 20 in sequence. As an example, in solution, a bottom portion 146 of article 20 may be formed first. This may enable the remainder of the article 20 to rest on a bottom portion 148 of the build chamber 124 so that as portions of the article 20 are formed in the solution, the article 20 is no longer dissolved and falls out of the solution.

As also described in further detail below, the article 20 may, in one embodiment, be formed all at once by directing a three-dimensional projection into the build chamber 124 using, for example, constructive interference of the emissions from one or more emission devices, projection of an optical three-dimensional pattern using predetermined diffraction patterns, and other techniques. For example, the system controller 140 may adjust the dynamic template 74 to reproduce an interference pattern. When the emission device 72 is activated, such as if it is a laser, the emission may traverse the dynamic template 74 and produce a three-dimensional projection within the build chamber 124. By projecting into a medium, the light is able to focus onto a region within the build chamber 124 to produce, for example, an image of the article 20 (or a portion thereof, such as two or more sides). If the light is intensified, for example using constructive interference from other emitters, the light may provide sufficient energy to excite a three-dimensional pattern within the bulk substrate 14 so as to cause photocatalytic reactions to occur, thereby producing the article 20 according to the image.

In this regard, to enable further control over the excitation of the bulk substrate 14, the dynamic template 74 may cause interaction between multiple wavefronts so as to cause particular types of interference to occur, and in specific places. Moving now to FIG. 6, an embodiment of a manufacturing system 120 is depicted as including multiple emission devices, including a first emission device 160 and a second emission device 162, configured to direct first and second emissions 164, 166, respectively, toward the bulk substrate 14. Specifically, the first and second emissions 164, 166 are directed toward the bulk substrate 14 from a single side (e.g., toward the first side 126 of the build chamber 124), and via the dynamic template 74. The first and second emissions 164, 166 may be optical, acoustic, or both, and may, in certain embodiments, individually or collectively be of sufficient energy, wavelength, etc., to cause physical and/or chemical changes in the material of the bulk substrate 14. The physical or chemical changes may, in turn, be sufficient to cause a portion of the article 20 to be formed.

The dynamic template 74, as noted above, is controlled by either or both of the template control circuitry 136 and the system controller 140 to generate, for example, one or more guide paths configured to direct emissions toward the bulk substrate 14 in a controlled manner. In accordance with the illustrated embodiment, the system controller 140 may cause the template control circuitry 136 to adjust the arrangement of the inclusions 132 so as to form multiple guide paths, as shown in expanded portion 170. As shown, the dynamic template 74 may form a first guide path 172 and a second guide path 174, which may combine to form a combined guide 176 to enable enhanced interactions between the first and second emissions 164, 166. In accordance with an embodiment, interactions within the combined guide 176 may produce a combined emission 178, which is depicted in a second expanded portion 180.

The combined emission 178 may result from constructive interference, destructive interference, or a combination thereof, of the first and second emissions 164, 166. Indeed, the combined emission 178 may have a variety of characteristics depending on the nature of the first and second emissions 164, 166 and the manner in which they are guided through paths 172, 174. For example, in one embodiment, the first emission 164 and the second emission 166 may be acoustic waves. The respective frequencies of the first emission 164 and the second emission 166, as well as their respective phases, may be selected so as to interact in a predetermined manner to produce the combined emission 178 having desired characteristics (e.g., frequency, power).

In one aspect of the present disclosure, the combined emission 178 may be produced in a manner such that when the combined emission 178 deposits energy into a molecular arrangement 181 of the bulk substrate 14 (e.g., an atomic lattice), the molecular arrangement 181 vibrates with a frequency and power sufficient to cause the bulk substrate 14 to melt, sinter, or the like, at a predetermined location within the build chamber 124. This process may be further appreciated with reference to additional expanded region 180. The molecular arrangement 181 may be an atomic lattice or molecular lattice, such as a crystal structure, located in a focal point, focal region, or focal area of the bulk substrate 14 within the build chamber 124.

In certain embodiments, the molecular arrangement 181, as a result of interaction with the combined emission 178, may be imparted with a mechanical (e.g., pressure) wave when the combined emission 178 is acoustic. Such a pressure wave may be used, for example, to create shockwaves focused within predetermined locations of the bulk substrate 14. Additionally or alternatively, the combined emission 178 may impart energy to the molecular arrangement 181 (e.g., of an individual granule or a collection of granules of the bulk substrate 14) such that the molecular arrangement 181 oscillates at a superharmonic frequency of the combined emission 178. The superharmonic oscillation of the molecular arrangement 181 may result in heating of the bulk substrate 14, which in turn forms all or a portion of the article of manufacture 20.

During operation of the system 120, the system controller 140 may cause the template control circuitry 136 to adjust the positions of the first guide portion 172, the second guide portion 174, the combined guide 176, or any combination thereof, to change the portion of the substrate 14 being subjected to the combined emission 178. Further, the system controller 140 may cause the template control circuitry 136 to split the combined guide path 176 into multiple paths to subject multiple regions of the bulk substrate 14 to the combined emission 178. In other words, the combined guide path 176 may split into multiple divergent paths so as to enable the formation of multiple heated regions of the bulk substrate 14 at substantially the same time.

In a similar manner, the template control circuitry 136 may, additionally or alternatively, cause the first and second emissions 164, 166 to be directed to multiple combined paths, or to be directed entirely separately through the dynamic template 74 and to the bulk substrate 14. One technical effect of multiple emissions being simultaneously directed to the bulk substrate 14 is that multiple portions of an article of manufacture may be formed at substantially the same time.

As with the embodiments described above with respect to FIG. 5, the depth of the emission focus (and energy deposition) in the bulk substrate 14 (e.g., as determined by distance from the first side 126 to a second side 182 opposite the first), may be adjusted by varying parameters of the emission devices 160, 162, the dynamic template 74, or a combination. For example, a periodicity of the inclusions 132 within the first guide path 172, the second guide path 174, or the combined guide path 176, may be adjusted to adjust (e.g., filter) component frequencies of the emissions, thereby acting as a phononic crystal that enables only selected wavelengths through the dynamic template 74. Additionally or alternatively, the power and intensity of the emission devices 160, 162, as well as the interactions of multiple emissions at controlled locations, may be adjusted.

Figure 7:
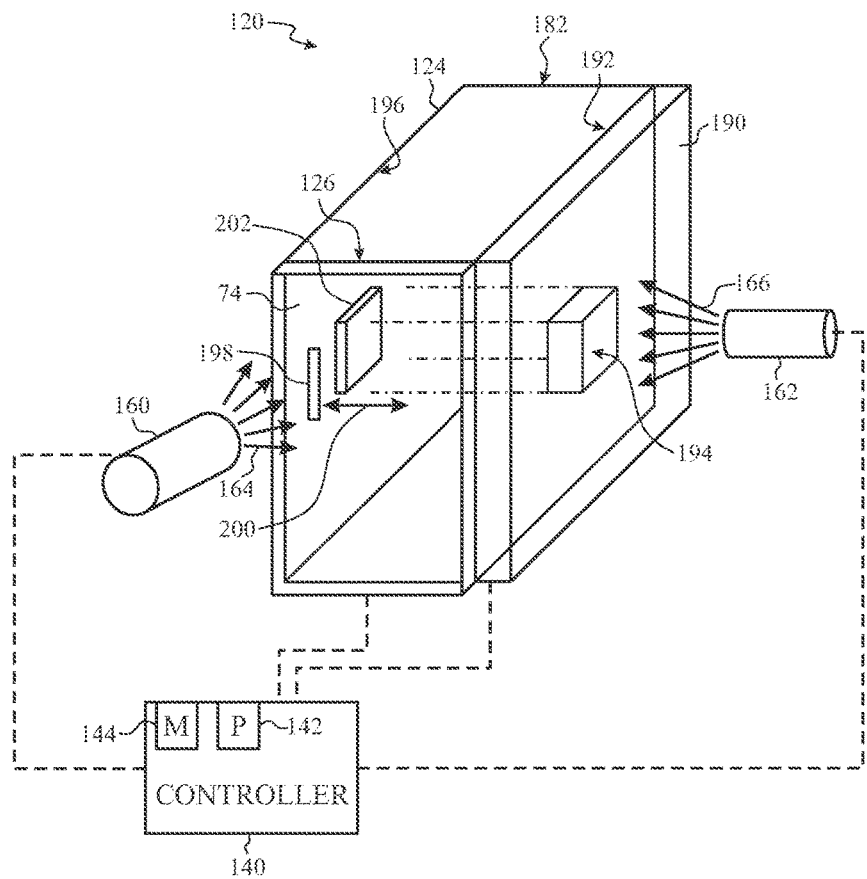
FIG. 7 is a perspective view of an embodiment of a manufacturing system having multiple dynamic templates for directing controlled emissions in an overlapping relationship toward a bulk substrate to generate patterns of excitation in the substrate, the patterns corresponding to a geometry of an article of manufacture produced by the excitation.

Indeed, the dynamic template 74 described above with respect to FIGS. 4-6 may be used alone, or in combination with other template or masking features. For example, in the embodiment of the system 120 depicted in FIG. 7, the dynamic template 74 may be used on the first side 126 of the build chamber 124, while another mask or an additional dynamic template 190 may be used on a third side 192 of the build chamber 124. In other words, multiple masking/templating features may be utilized for different emissions (e.g., multiple dynamic templates may be used for different sources of emission). The third side 192, as shown, is oriented crosswise relative to the first and second sides 126, 182. Therefore, generally, the additional dynamic template 190 may be oriented crosswise relative to the dynamic template 74. Such a configuration may be desirable to cause emissions directed through the different dynamic templates 74, 190 to interfere (constructively or destructively) with each other within the build chamber 124.

As an example, during operation, the system controller 140 may cause the additional dynamic template 190 to produce a first pattern 194 (using respective inclusions, matrix, and template control circuitry), which may correspond to a first shape or three-dimensional pattern for excitation. The system controller 140 may cause the second emission device 162 to direct the second emission 166 toward the third side 192 of the build chamber 124. The additional dynamic template 190, having the first pattern 194, may cause the second emission 166 to produce a first three dimensional projection within the bulk substrate 14, where the first three-dimensional projection corresponds to excitation of the material of the bulk substrate 14 in a particular region (e.g., the regions of phonon generation in FIGS. 1-3). In certain embodiments, the second emission 166 may cause excitation of the material of the bulk substrate 14 in a region extending from the third side 192 of the build chamber 124 to a fourth side 196 of the build chamber 124 opposite the third side 192, and bounded generally by the dimensions of the first pattern 194 in the additional dynamic template 190.

At the same time, the system controller 140 may cause the first emitter 160 to direct the first emission 164 toward the first side 126, through the dynamic template 74. The system controller 140, in combination with the template control circuitry 136, may cause the dynamic template 74 to produce a second pattern 198 using the inclusions 132 and the matrix 130. The first emission 164 is, therefore, directed to the bulk substrate 14 through the second pattern 198, and may interact with the second emission 166, or may interact with an excited form of the bulk substrate 14 to cause a physical or chemical change in the material of the bulk substrate 14 (e.g., heating, melting, sintering, curing). As an example, the interaction may result in a change in the oscillation of an atomic lattice of the bulk substrate 14. Thus, generally, the first and second emissions are directed into the build chamber 124 in crosswise intersecting directions to cause interference and/or to increase emission intensity in focal points or regions of the bulk substrate 14. In this way, one of the emissions (e.g., the second emission 166) serves to generate an excitation template, onto which the other emission (e.g., the first emission 164) is projected to produce a three-dimensional pattern of sufficient excitation energy to write all or a portion of the article 20 into the bulk substrate 14.

In the illustrated embodiment, for example, the first emission 164 and the second emission 166 would, together, overlap or cause overlapping interference to form a section 202 of the article of manufacture 20. Further, while the first and second emissions 164, 166 may remain static in certain configurations, in the illustrated embodiment, the dynamic template 74 adjusts the inclusions 132 and/or matrix 130 to move the second pattern 198 along a direction 200 so as to progressively form different sections (including section 202) of the article of manufacture 20. In other words, while one emission forms a first three-dimensional projection in the build chamber 124 and does not move, the other emission scans over the first three-dimensional projection to cause a change in the material of the bulk substrate 14. The term "three-dimensional projection," as used herein, may refer to a three-dimensional projection of an emission, or the effect that an emission has on the substrate 14 in three dimensions, or both.

Depending on the material of the bulk substrate 14 and intensity of the emissions, the system 120 of FIGS. 5 and 6 may enable the formation of articles of manufacture using a process where the article 20 is written into the bulk substrate 14 within the build chamber 124. Unlike traditional additive manufacturing techniques, such embodiments may not require material to be progressively added to the build chamber 124 during the manufacturing process. However, such progressive addition may be performed in certain situations, for example due to settling or to introduce new types of materials into the build chamber 124. Indeed, the use of a dynamic template in the manner set forth above may enable a progressive formation of the article 20, or an "all at once" formation of the article 20.

Figure 8:
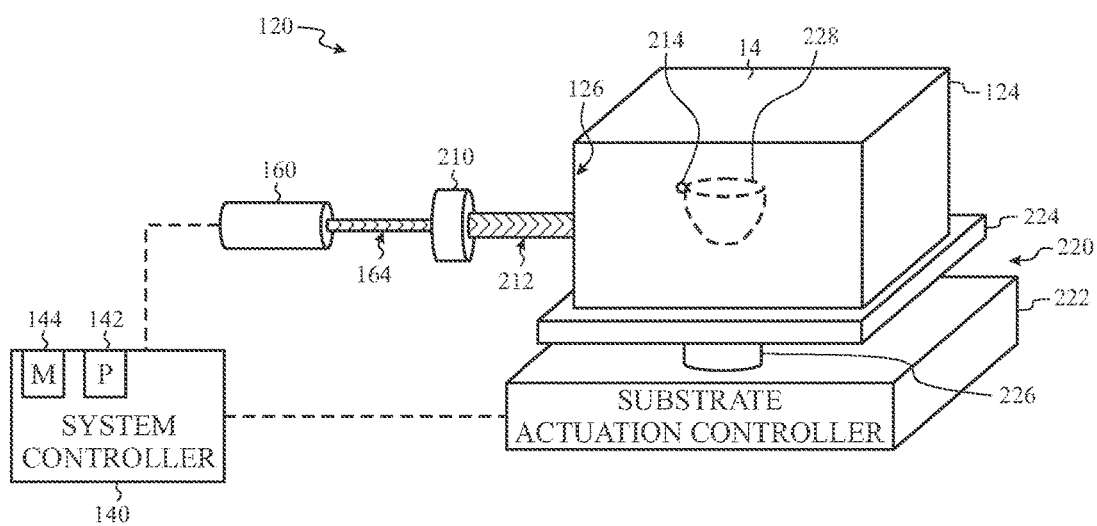
FIG. 8 is a perspective view of an embodiment of a manufacturing system having an optical emission device and a focusing device configured to generate acoustic emissions from the optical emission device to generate patterns of excitation within the bulk substrate, the patterns of excitation corresponding to a geometry of an article of manufacture produced by the excitation.

While the dynamic template 74 may provide several advantages from the standpoint of affecting, filtering, and controlling certain types of emissions directed toward the bulk substrate 14 within the build chamber 124, certain embodiments of the present disclosure may not necessarily utilize the dynamic template 74. Indeed, other features configured to focus, transduce, filter, or otherwise affect the emissions directed toward the bulk substrate 14 may be utilized in accordance with the present disclosure, either alone or in combination with the dynamic template 74. FIG. 8 is a perspective view of an embodiment of the manufacturing system 120 having such a configuration. Specifically, as shown, the system 120 includes the first emission device 160, which is configured to direct the first emission 164 (e.g., a first wavefront) toward a focusing device 210 disposed between the first side 126 of the build chamber 124 and the first emission device 160. The first emission 164 may be acoustic, optical, sub-acoustic, or the like. Accordingly, the emission device 160 may be any emission device suitable to produce such emissions.

The system controller 140 at least partially controls operational parameters of the first emission device 160 to control the timing, power, flux, etc., of the first emission 164, and may also control operational parameters (e.g., tilt, distance relative to the first emission device 164 and/or the build chamber 124) of the focusing device 210. In such embodiments, the system controller 140 may be communicatively coupled directly to the focusing device 210, or to a mechanical actuator (not shown) coupled to the focusing device 210. In certain embodiments, the focusing device 210 may be configured to focus or expand the first emission 164 to control regions of the bulk substrate 14 subjected to the first emission 164. In one aspect of the present disclosure, the focusing device 210 may transduce and focus the first emission 164 to produce a transduced emission 212. In another aspect of the present disclosure, the focusing device 210 may adjust a frequency, phase, or another parameter of the first emission 164.

For example, the first emission 164 may be an optical wavefront, and the transduced emission 212 may be an acoustic wavefront. In such embodiments, the focusing device 210 may include an opto-acoustic transducer. As another example, the first emission may be an optical wavefront, and the transduced emission 212 may be another optical wavefront of a different wavelength and/or frequency (e.g., sufficiently tuned to cause melting and/or sintering in the bulk substrate 14).

In embodiments where the focusing device 210 is an opto-acoustic transducer, the focusing device 210 may include one or a combination of materials configured to absorb the first emission 164, undergo an excitation, and emit sound or other low frequency waves (e.g., vibration) as a result. As one example, the focusing device 210 may include one or more layers of nanomaterials (e.g., carbon nanotubes) disposed on a lens (e.g., a fused silica optical lens) and configured to absorb the first emission 164. The one or more layers of nanomaterials may become heated as a result of this absorbance, and transfer the heat to one or more additional layers of an expandable material, such as elastomeric materials (e.g., polydimethylsiloxane (PDMS)). When the heat is transferred to the layers of the expandable material, the layers may exhibit thermo-elasticity, resulting in rapid expansion and contraction so as to generate high frequency sound waves (e.g., greater than 15 MHz). The nanomaterials and elastomer may be disposed on a concave surface of the optical lens of the focusing device 210, which may enable focusing of the acoustic wavefront using focusing methods similar to those used in optics (e.g., using calculations of focal length based on physical parameters of the focusing device 210).

In accordance with present embodiments, the transduced emission 212 may produce a pressure wave through the bulk substrate 14, with a focal region 214 of the bulk substrate 14 being characterized as having a much higher pressure compared to its surroundings. This may be referred to as a peak pressure, and can cause shockwaves to occur within the bulk substrate 14. More specifically, non-linear propagation of the component sound waves of the transduced emission 212 through the bulk substrate 14 may cause a shockwave to occur within the bulk substrate 14, due to the presence of high and low pressure waves therein. The shockwave may cause sufficient energy deposition into the bulk substrate 14 to cause the focal region 214 to undergo a physical change to cause, for example, melting, sintering, or the like, at least at the focal region 214. Indeed, in certain embodiments, the shockwave may provide sufficient energy to the focal region 214 to cause sections of a predetermined size to combine as a result of the physical change, thereby forming a portion of an article of manufacture.

The amplitude of the shockwaves produced by the transduced emission 212 may be controlled by the power of the first emission device 160, which may be implemented as a pulsed laser with a beam expander. The laser may be pulsed toward the beam expander, which expands the tightly focused laser light so as to interact with substantially the entire focusing device 210 (e.g., an entire surface of a lens). The location (e.g., distance from the first side 126 of the build chamber 124) of the focal region 214 within the build chamber 124 may be controlled by the geometry of the lens of the focusing device 210 (e.g., its diameter and curvature), and the power of the first emission device 160. The power of the first emission device 160 may affect the amount of energy deposited into the opto-acoustic transducing materials and the associated energy of the emitted sound waves. The size of the focal region 214 may also be determined by the power of the first emission device 160 and the size of the focusing device 210.

To enable further control over the position of the focal region 214 (and therefore the portion of the article of manufacture to be formed), the system 120 may also include a substrate actuation system 220 configured to move the build chamber 124 in one or more directions relative to the first emission device 160 (and other emission devices). It should be noted that the actuation system 220, while shown specifically in FIG. 8, may be used in combination with any of the embodiments described herein.

The system controller 140 may be communicatively coupled to the substrate actuation system 220, such as to an actuation controller 222 that serves as a stationary base and may also include various processing and control devices. The system controller 140 may send control signals that are coordinated with the operation of the first emission device 160 to control movement of the build chamber 124 via the actuation controller 222. The movement of the build chamber 124 may be performed using a movable platform 224 connected to the actuation controller 222 via an actuation mechanism 226, which may include one or more servomechanisms and/or other rotating and translational devices. The actuation mechanism 226 may be configured to move the movable platform 224 in one or more translational and rotational directions relative to the actuation controller 222 (e.g., the base) and relative to the first emission device 160. In this way, the focus of the transduced emission 212 may remain stationary while the bulk substrate 14 is moved in relation thereto to adjust the region of the bulk substrate 14 being subjected to excitation. The substrate actuation system 220 may, in certain embodiments, be configured to perform small vibrations or the like to enable settling of the bulk substrate 14 before, during, or after formation of the article 20. However, it should be noted that in accordance with any of the embodiments disclosed herein, some vibration of the bulk substrate 14 (e.g., a powder bed) may assist in the powder filling in areas vacated by powder (or other solid) that has been sintered, melted, etc.

It should be appreciated from the foregoing that the precision of the focal region affects the overall geometry of the formed article of manufacture 20. Accordingly, the substrate actuation system 220 may, additionally or alternatively, include a vibration dampening system or device configured to mitigate unwanted vibrations in the bulk substrate 14.

As set forth above, the system controller 140 may include a three-dimensional model of an article of manufacture stored in the non-transitory memory 144. In accordance with the illustrated embodiment, the system controller 140 may cause the movable platform 224 to move (e.g., via control of the actuation controller 226) according to the three-dimensional model. For example, the actuation controller 222 may translate and/or rotate the movable platform 224 via the actuation mechanism 226 in a manner that enables the focal region 214 to trace a surface outline 228 of the article of manufacture 20 in accordance with the three-dimensional model. In this way, the focal region 214 may be used to write the article 20 into the bulk substrate 14. In further embodiments, the first emission device 160 (or any other emission devices) may be moved in addition to or in lieu of the build chamber 124.

Figure 9:
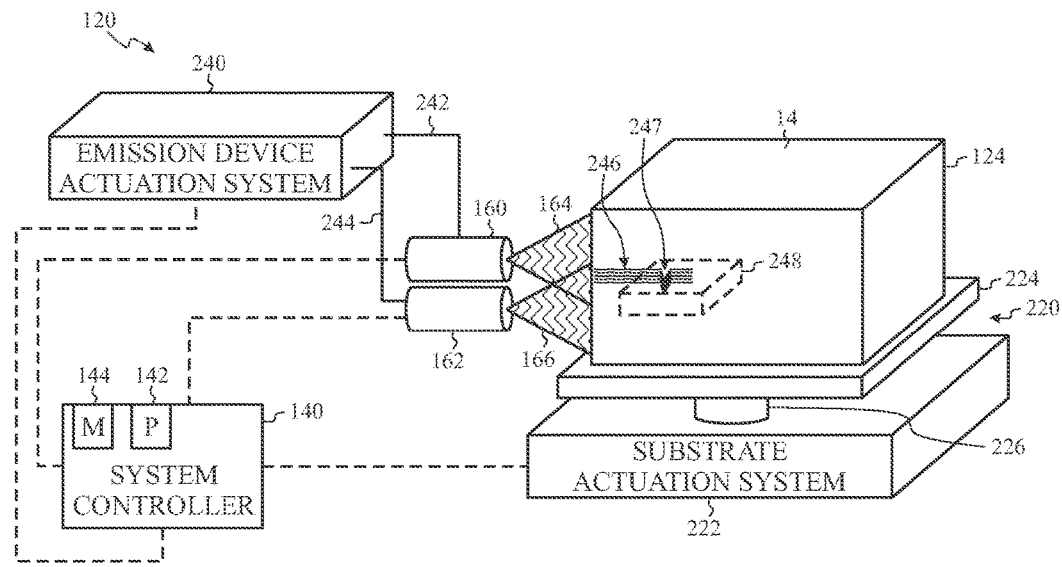
FIG. 9 is a perspective view of an embodiment of a manufacturing system having multiple emission devices configured to direct overlapping emissions into a bulk substrate to generate patterns of excitation within the bulk substrate to produce an article of manufacture, the multiple emission devices being coupled to an emission device actuation system configured to move the emission devices to control patterns of excitation generated by the overlapping emissions, wherein the patterns of excitation correspond to a geometry of an article of manufacture produced by the excitation.

Such an embodiment of the manufacturing system 120 is depicted in FIG. 9, where the system controller 140 is communicatively coupled to an emission device actuation system 240 configured to move emission devices to facilitate the formation of the article of manufacture 20. The system 120 may include one emission device, or multiple emission devices as illustrated (e.g., including the first emission device 160 and the second emission device 162). The emission devices may be moved by actuating arms 242, 244 (or any other actuation mechanism) of the emission device actuation system 240.

The emission device actuation system 240, as illustrated, is intended to represent any appropriate configuration of a system configured to automatically move one or more of the emission devices with reproducibility and accuracy. For example, the emission device actuation system 240 may include various servomechanisms housed in one or more locations that are controllable by local or remote processing devices, which may correspond to the system controller 140 or another controller specifically configured to control the movement of the emission devices. In certain embodiments, the emission device actuation system 240 may also incorporate various features configured to control operational parameters (e.g., power, pulse rate, flux, intensity) of the first and second emission devices 160, 162. As an example, during operation, the system controller 140 may coordinate the movement of the first and second emission devices 160, 162 performed by the emission device actuation system 240 with movement of the bulk substrate 14 performed by the substrate actuation system 220 to adjust which portion of the substrate 14 is subjected to focused emissions from the first and second emission devices 160, 162. The system controller 140 may also coordinate emission parameters in conjunction with these movements.

As also depicted in FIG. 9, the emission device actuation system 240 may move the first and second emission devices 160, 162 into a positional relationship in which their respective emissions 164, 166 overlap. This overlapping relationship may encourage, for example, constructive interference of the first and second emissions 164, 166 within the build chamber 124 to produce a combined emission 246. In accordance with one aspect of the present embodiments, the overlap of the first and second emissions 164, 166 (and others, as appropriate) may be controlled to encourage vibration and heating within the bulk substrate 14 (e.g., due to constructive interference, harmonic oscillations, or phonon generation). In accordance with the illustrated embodiment, for example, the combined emission 246 may be controllably generated to encourage peak pressure generation, vibration, and/or heat intensity at certain locations within the bulk substrate 14, which may be referred to as a focal region 247. The focal region 247 may be moved so as to correspond to a surface outline 248 of the article of manufacture 20, as shown.

Figure 10:
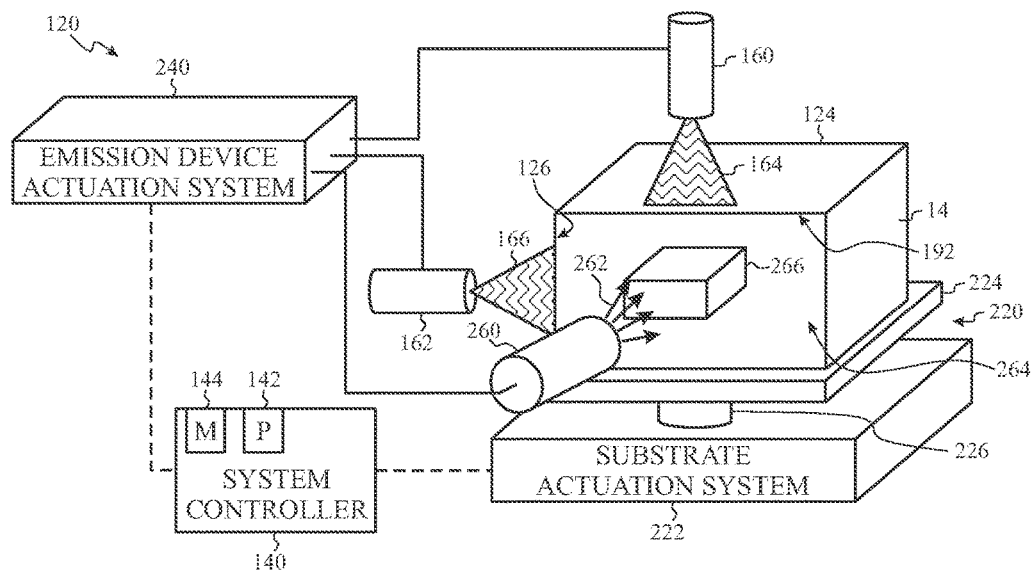
FIG. 10 is a perspective view of an embodiment of a manufacturing system having multiple emission devices configured to direct overlapping emissions into a bulk substrate from multiple crosswise directions, the manufacturing system also having a build chamber positioned on a substrate actuation system to move the substrate to control where the overlapping emissions are directed to form patterns of excitation in the substrate, the patterns corresponding to a geometry of an article of manufacture produced by the excitation.

To further enhance the speed of manufacturing an article, certain embodiments of the system 120 may incorporate emission devices positioned on several positions relative to the build chamber 124, as shown in FIG. 10. Specifically, as shown in FIG. 10, an embodiment of the system 120 may include the first and second emission devices 160, 162 configured to direct the first and second emissions 164, 166, toward the third and first sides 192, 126 of the build chamber 124, respectively. The system 120 also includes a third emission device 260 configured to direct a third emission 262 toward a fourth side 264 of the build chamber 124, where the fourth side 264 is crosswise relative to the first and third sides 126, 192. In this way, the system 120 includes multiple emission devices, each emission device being configured to direct a respective emission toward the build chamber 124 in a direction crosswise relative to other emissions. In this regard, it should be noted that the build chamber 124 may have any geometry, such as curved (e.g., a geodesic dome), polygonal having any number of sides, and so forth. Accordingly, the number of sides, emission devices, and associated emissions used to produce an article is not particularly limited.

In accordance with certain embodiments of the present disclosure, the first, second, and third emissions 164, 166, 262 are emitted in this way to encourage interference (e.g., constructive) in certain regions (e.g., a focal region) of the build chamber 124. In embodiments where the emissions 164, 166, 262 are acoustic, the interference may cause amplitude modulation of the emissions 164, 166, 262, or amplitude modulation of vibrations or phonons generated in the bulk substrate 14 from the emissions. This amplitude modulation may be sufficient to cause high energy vibrations, high pressure shockwaves, and the like, within the material of the bulk substrate 14 to cause otherwise unconnected portions of the bulk substrate 14 (e.g., separate powder, particulates, or pellets) to combine via sintering, melting, or a similar process.

In certain other embodiments, one or more of the first, second, and third emission devices 160, 162, 260 may be configured to cause positioning of the bulk substrate 14. For example, in embodiments where the bulk substrate 14 is appropriately proportioned (e.g., of sufficiently low density), one or more of the first, second, and third emission devices 160, 162, 260 may be configured to cause acoustic levitation or other acoustic positioning (e.g., via formation of a standing wave) of a portion of the bulk substrate 14. One or more of the emission devices that is not used for this positioning may, instead, be used to cause excitation to sinter, melt, or cause some other combining process to occur to form the bulk substrate 14 in place.

Generally, the first, second, and third emissions 164, 166, 262 may, individually, be acoustic and/or optical. As an example, in certain embodiments, the system 120 may use a combination of optical and acoustic phonon generation within the bulk substrate 14 to encourage the amplification of selected vibrational modes. These vibrational modes may be used to concentrate vibration and heating in a region of the bulk substrate 14 sufficient to cause material combination through melting, sintering, etc., as noted above. The focusing may be performed, as set forth above, by intersecting the emissions or intersecting pressure waves generated from the emissions, for example using the emission device actuation system 240 and/or the substrate actuation system 220. Thus, controlling where these emissions or excitations intersect may, in turn, control the position where the article 20 is formed.

In one aspect of the present disclosure, the interference between the emissions or excitations may be directed along an outline of the article, as set forth above with respect to FIGS. 6-9. In another aspect, as illustrated, the interference may produce a complex geometry 266 corresponding to all or a portion of the article 20. That is, rather than exciting a symmetrical focal point or region of the bulk substrate 14, the system controller 140 may cause a plurality of emitters (e.g., including the first, second, and third emitters 160, 162, 260) to excite a region of the bulk substrate 14 in the build chamber 124 in a specific, well-defined geometry. As shown, the complex geometry 266 may represent multiple faces (e.g., two or more faces) of the article of manufacture 20, where the faces are formed by generating a three-dimensional projection of interfering waveforms (e.g., optical or acoustic waveforms or pressure waveforms generated in the bulk substrate 14).

The three-dimensional projection may be generated by controlling emission parameters such as frequency, phase, fluence, etc., of the first, second, and third emission devices 160, 162, 260, to thereby control the regions where they generate maximum fluence within the build chamber 124. The particular shape of the three-dimensional projection may be produced using, for example, holographic plates (for optical conversions), phononic crystals (for acoustic conversions), phoxonic crystals (e.g., for acoustically and optically-induced conversations) masking devices, and similar features.

Further, a number of emitters (e.g., ultrasound emitters) may be used (e.g., 10 emitters, 15 emitters, 20 emitters, or more), and their associated parameters controlled to produce a shaped region within the build chamber 124 where the bulk substrate 14 undergoes maximum excitation (e.g., to generate phonons, heat, or undergo an optically-induced chemical reaction). In this regard, it should be noted that as the number of emission devices increases, the faster the article of manufacture 20 will be produced, since multiple complex geometries can be formed at substantially the same time and from different directions. Indeed, as the number of emitters increases, so does the number of different points or regions where constructive interference may occur, thereby enabling a sufficient deposition of energy into the bulk substrate 14 to cause a physical and/or chemical change. This may be further appreciated with reference to FIG. 11, which is a top-down view of an embodiment of the manufacturing system 120 including multiple emitters configured to direct emissions in crosswise (e.g., orthogonal) relationships relative to one another.

Figure 11:
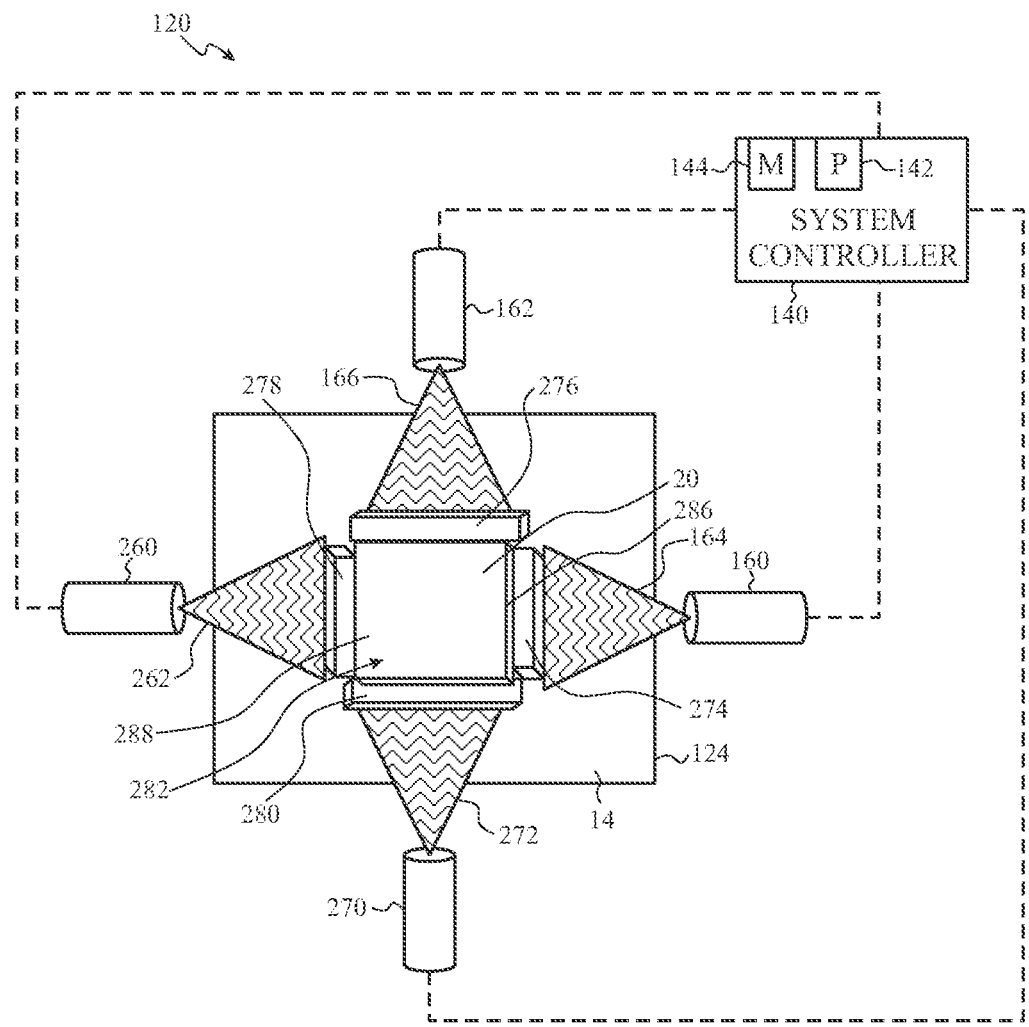
FIG. 11 is a top-down view of an embodiment of a manufacturing system having multiple acoustic emission devices configured to direct emissions toward a build chamber having a bulk substrate from multiple crosswise directions, the manufacturing system having a plurality of phononic crystals arranged as a negative of an article of manufacture.

The embodiment of the manufacturing system 120 of FIG. 11 includes, for instance, the first, second, and third emission devices 160, 162, 260 each configured to generate their respective emission 164, 166, 262. The embodiment of the system 120 also includes a fourth emission device 270 configured to generate a fourth emission 272 directed toward the bulk substrate 14. As shown, the emission devices are positioned orthogonally to one another so that their emissions might overlap in a predetermined manner. Again, this overlap is specifically utilized by the system 120 to increase excitation intensity and thereby cause vibration, heating, photocatalysis, and so forth.

The illustrated embodiment of the system 120 also includes a plurality of phononic crystals, including a first phononic crystal 274 configured to affect acoustic emissions from the first emission device 160, a second phononic crystal 276 configured to affect acoustic emissions from the second emission device 162, a third phononic crystal 278 configured to affect acoustic emissions from the third emission device 260, and a fourth phononic crystal 280 configured to affect acoustic emissions from the fourth emission device 270.

The illustrated phononic crystals 274, 276, 278, 280 are arranged within the build chamber 124 so as to cause the emissions that pass therethrough to intersect at an overlap region 282. The overlap region 282 may be considered to represent a region where three-dimensional excitations or emissions overlap to produce a three-dimensional pattern corresponding to the shape of the article 20. For example, the phononic crystals 274, 276, 278, 280 may each have an individual shape that enables selected geometries within the bulk substrate 14 to be excited within the overlap region 282. When the excitations (or emissions) overlap, the portions where those overlaps occur may form portions of the article 20.

The phononic crystals 274, 276, 278, 280 may also include configurable acoustic metamaterials as set forth above with respect to FIGS. 4-6. Accordingly, the phononic crystals 274, 276, 278, 280 need not be manufactured to a specific, fixed shape. Rather, when configurable, the phononic crystals 274, 276, 278, 280 may, instead, be all or a portion of a dynamic template as set forth above.

In still further embodiments, the phononic crystals 274, 276, 278, 280 may be arranged as a negative and/or positive of the article of manufacture 20. In such embodiments, any emissions that pass through the phononic crystals 274, 276, 278, 280 may be used to produce the article 20. As an example, the phononic crystals 274, 276, 278, 280 may be arranged as a negative of a beverage container, a clamshell food container, or any other shape, depending on the number of phononic crystals utilized. As yet a further example, any one or a combination of the phononic crystals 274, 276, 278, 280 may be shaped or otherwise configured in a similar manner to the separate portions of a mold (e.g., configured as mold halves). For instance, a first subset of the phononic crystals 274, 276, 278, 280 may be configured as a male portion, while a second subset of the phononic crystals 274, 276, 278, 280 may be configured as a female portion that corresponds in shape to the male portion to produce an inner surface and outer surface, respectively, of the article 20.

The penetration depth of the emissions into the bulk substrate 14 may be controlled, for example, to control a thickness of the article 20. Indeed, portions of relatively continuous surfaces may be formed with anisotropic properties due to the ability to control the excitation properties of the emission devices. For example, a first wall 286 of the article 20 may have a first thickness, while a wall side 288 opposite the first wall 286 may have a second thickness different than the first thickness. In still further embodiments, the phononic crystals 274, 276, 278, 280 may be coupled to actuation devices so that they can be arranged to produce a variety of different geometries and thereby produce different articles of manufacture.

In this regard, it should be noted that articles formed in accordance with the present disclosure may have a number of unique properties. For example, in accordance with an embodiment, the article of manufacture 20, when polymeric, may have walls that have a clarity index that could typically not be achieved using traditional manufacturing techniques. For example, the first wall 286 of the article of manufacture 20 may have a thickness of greater than 0.1 inches (e.g., between 0.1 inches and 1 inch), but remain relatively clear compared to other manufacturing techniques, such as those where such a thickness can only be achieved by multi-layer assembly. For example, it is believed that formation of an article of manufacture having thicknesses on the scale of greater than 0.1 inches, when produced layer-by-layer, do not achieve the same amount of clarity as, for example, a blown film due to the relative non-alignment of constituent materials (e.g., polymer chains) present within the different layers. However, in certain embodiments of the present disclosure, the different sides or portions of the article of manufacture 20 would be produced, generally, as a single layer.

Furthermore, the thicknesses of, for example, the walls of the article of manufacture 20 may be larger than is feasible in a blow molding or similar traditional manufacturing setup. This is because as the thickness of the outer surface of the article becomes greater, in traditional manufacturing techniques, the surface will have a tendency to collapse or "droop" before hardening. However, in accordance with the present disclosure, the outer surface of the article of manufacture, when initially formed, is supported by surrounding material of the bulk substrate 14, which provides inherent structural support. In addition, because the outer surface of the article 20 will be at a focal point, region, or geometry, the surrounding material of the bulk substrate 14 will have a relatively lower temperature, and may act as a heat sink to facilitate cooldown and hardening of the as-formed article 20.

Figure 12:
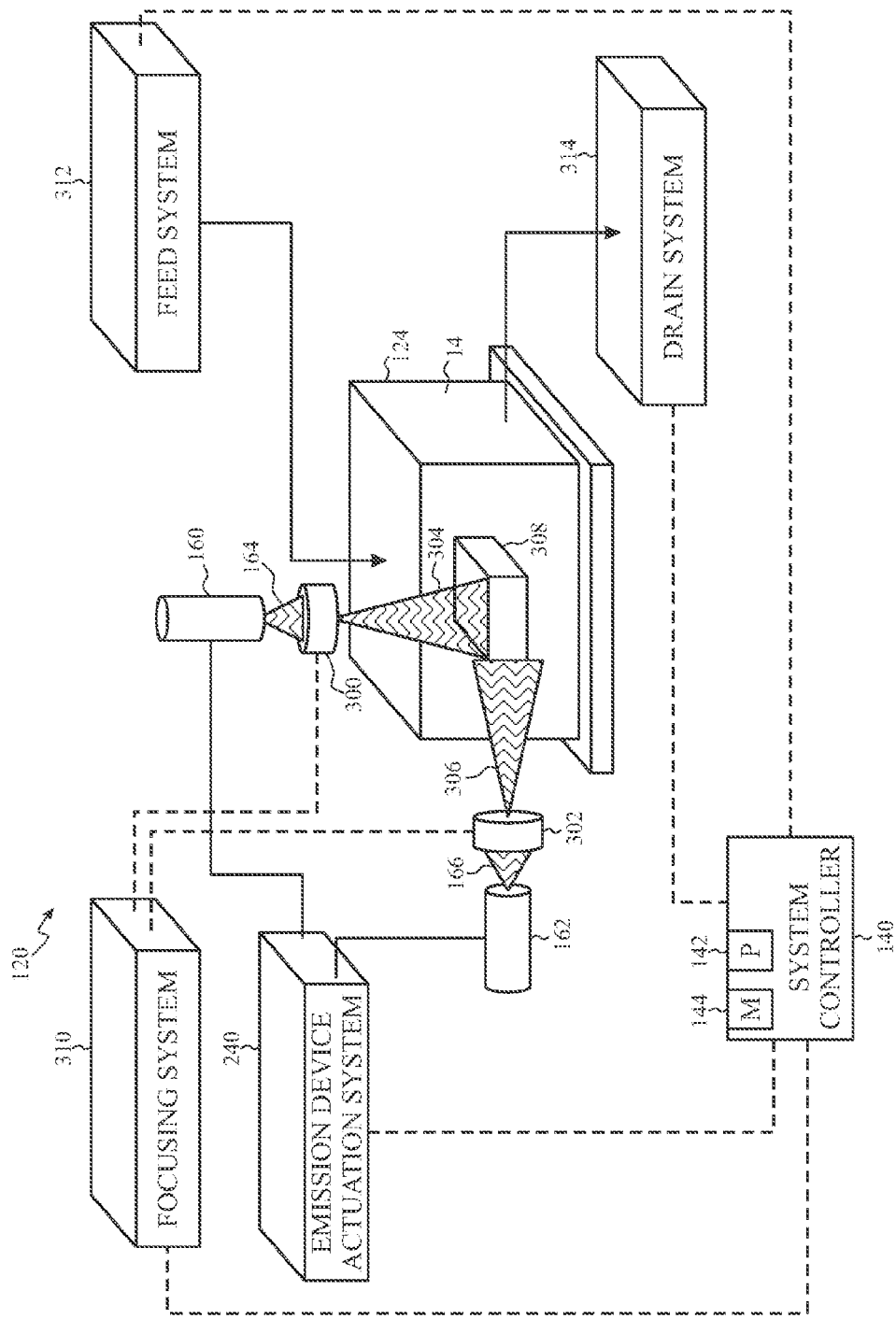
FIG. 12 is a perspective view of an embodiment of a manufacturing system having optical emission devices configured to direct emissions toward a build chamber having a bulk substrate from multiple crosswise directions, the manufacturing system having a plurality of focusing elements arranged to cause a pattern of excitation corresponding to a geometry an article of manufacture.

To the extent that the phononic crystals 274, 276, 278, 280 may be considered to represent a focusing system for the sound waves emitted by the emitters 160, 162, 260, 270, embodiments of the present disclosure also include configurations in which optical focusing elements may be used to facilitate pattern-specific excitation. For example, referring to FIG. 12, an embodiment of the manufacturing system 120 is shown as including the first and second emission devices 160, 162, as well as a first focusing device 300 and a second focusing device 302, among other features. The first focusing device 300, as illustrated, is configured to focus or otherwise adjust the first emission 164 to produce a first adjusted emission 304. As an example, the first focusing device 300 may be a masking device that controls which regions of the bulk substrate 14 are subjected to emissions from the first emission device 160, or may be a holographic plate through which light may be directed to generate a first excitation pattern within the substrate 14.

The second focusing device 302 is configured to focus or otherwise adjust the second emission 166 to produce a second adjusted emission 306. The second focusing device 302 may also be a masking device that controls which regions of the bulk substrate 14 are subjected to emissions from the second emission device 162, or may be a holographic plate through which light may be directed to generate a second excitation pattern within the substrate 14. As illustrated, the first and second adjusted emissions 304, 306 may overlap in a way that produces a combined excitation pattern that corresponds to a geometry 308 of the article of manufacture 20.

The first and second focusing devices 300, 302 may be communicatively coupled to a focusing system 310, as shown. The focusing system 310 may include various actuation devices and control circuitry configured to control a tilt and/or a distance from the bulk substrate 14 and/or the respective emission device, of the first and second focusing devices 300, 302. Additionally or alternatively, the first and second focusing devices 300, 302 may be adjustable, such as described above with respect to the dynamic template 74. In such embodiments, the focusing system 310 may be configured to send control signals to the focusing devices 300, 302 to adjust, for example, an interference pattern to enable reproduction of a three-dimensional image corresponding to a desired article of manufacture (e.g., the geometry 308).

The focusing system 310 may be controlled in concert with other components of the system 120 by the system controller 140. For example, the focusing system 310 may be controlled in concert with the emission device actuation system 240 to enable appropriate positioning of the focusing devices 300, 302.

As described in detail above, in embodiments where the emissions used to produce the article of manufacture 20 are optical, the bulk substrate 14 may be present as a solute in solution. Alternatively, the bulk substrate 14 may be present as a solid in a slurry or other suspension. In either configuration, it may be desirable to include features that enable the provision and removal of the bulk substrate 14 and an associated diluent or solvent to the build chamber 124 at appropriate times (e.g., before emission, after the article 20 is formed). Accordingly, embodiments of the manufacturing system 120, including those described above, may include a feed system 312 and a drain system 314.

The feed system 312 may be configured to provide a solid (e.g., granular) material as the bulk substrate 14 to the build chamber 124 as needed, for example in correspondence with any automated emission processes performed by the system 120. The feed system 312 may also, in certain situations, provide a diluent or solvent to the build chamber 124 as needed. The feed system 312 may be communicatively coupled to and controlled by the system controller 140 to enable appropriate amounts of the bulk substrate 14 to be present within the build chamber 124. For example, the system controller 140 may perform various monitoring processes to determine a quantity of the bulk substrate 14 present within the build chamber 124, and may perform various determinations as to whether the amount of the bulk substrate 14 within the build chamber 124 is appropriate for the types of emissions being used for manufacture. The amount may be represented as, for example, a density of the bulk substrate 14 within the build chamber 124, a concentration of the bulk substrate 14 within a solution contained within the build chamber 124, or a volume or weight percentage (or other weight or volume representation) of the bulk substrate 14 within a slurry or suspension.

Based on the example types of monitoring noted above, the system controller 140 may provide additional bulk substrate 14, diluent, solvent, or the like, to the build chamber 124 as appropriate. Additionally or alternatively, the system controller 140 may utilize the drain system 314 for the removal (e.g., selective removal, using filters or other size exclusion techniques) of one or more of the materials present within the build chamber 124 to obtain or maintain the amount of the bulk substrate 14 within the build chamber 124 to in an appropriate range.

The system controller 140 may also utilize the feed system 312 and/or the drain system 314 for product isolation. For example, after formation of the article of manufacture 20 using any of the techniques described above, the system controller 140 may wash excess bulk substrate 14 off of the formed article 20, and may remove residual bulk substrate, diluent, or solvent from the build chamber 124 to isolate the article 20.

Additional Description

As discussed above, present embodiments relate to the preparation of articles of manufacture by directing emissions toward a substrate to generate patterns of excitation. The patterns of excitation may cause physical and/or chemical changes in the patterns, which corresponds to desired geometries of the articles of manufacture. The following clauses are offered as further description of the present disclosure, and are intended to cover any and all combinations of the embodiments set forth above.

Embodiment 1. A method of manufacturing, comprising: selectively forming an article of manufacture using focused excitation by a process comprising: generating vibrations in a base material disposed within a build chamber; focusing the vibrations in a section of the base material; and controlling the focusing of the vibrations to cause the section of the base material to undergo a physical transformation to form at least a portion of the additive manufacturing part.

Embodiment 2. The method of embodiment 1, wherein generating vibrations in the base material comprises directing a waveform into the base material to cause phonon propagation through a lattice of the section of the base material, wherein the waveform includes infrasonic, sonic, or ultrasonic frequencies, or any combination thereof, or includes a thermal emission, or includes an emission generated from a phoxonic crystal.

Embodiment 3. The method according to any preceding embodiment, wherein directing the waveform into the base material comprises directing a first waveform into a phononic or phoxonic crystal using an acoustic source, forming a second waveform from the first waveform in the phononic or phoxonic crystal, and directing the second waveform into the section of the base material.

Embodiment 4. The method according to any preceding embodiment, wherein forming the second waveform from the first waveform in the phononic or phoxonic crystal comprises directing the first waveform into a focusing region of the phononic or phoxonic crystal having a matrix and inclusions positioned within the matrix, the inclusions having a spatial periodicity corresponding to a desired bandgap in the second waveform.

Embodiment 5. The method according to any preceding embodiment, wherein generating vibrations in the base material comprises directing an emission through a masking device to mask other sections of the base material from being subjected to the emission.

Embodiment 6. The method according to any preceding embodiment, wherein the masking device comprises one or more screens having a matrix and a movable material, wherein the matrix is transmittive with respect to the emission and the movable material is substantially non-transmittive with respect to the emission.

Embodiment 7. The method according to any preceding embodiment, wherein directing the emission through the masking device comprises forming a pattern on the one or more screens corresponding to a portion of the article of manufacture using the movable material and directing the emission through the matrix while blocking the emission with the movable material.

Embodiment 8. The method according to any preceding embodiment, wherein the process comprises adjusting the pattern after the portion of the article of manufacture is formed, adjusting the section of the base material in which the vibrations are generated, and forming another portion of the additive manufacturing part using the adjusted pattern.

Embodiment 9. The method according to any preceding embodiment, wherein generating vibrations in the base material comprises directing coherent light to a lens having one or more materials configured to transduce the coherent light into an ultrasonic wave, and directing the ultrasonic wave toward the base material, and wherein focusing the vibrations on the section of the base material comprises adjusting the lens to focus the ultrasonic wave on a focal region corresponding to the section.

Embodiment 10. The method according to any preceding embodiment, wherein generating vibrations in the base material comprises producing a shock wave at a focal region in the base material, shock wave resulting in heating, pressure, or both, that sinters the base material at the focal region.

Embodiment 11. The method according to any preceding embodiment, wherein controlling the focus of the vibrations to cause the section of the base material to undergo the physical transformation comprises increasing a frequency of oscillation within the base material to increase the temperature of the base material to a temperature suitable to cause the physical transformation.

Embodiment 12. The method according to any preceding embodiment, wherein the process comprises adjusting the frequency of oscillation within the base material of the additive manufacturing part to remove sections of the additive manufacturing part and thereby create patterns in the additive manufacturing part.

Embodiment 13. A manufacturing system, comprising: a build chamber configured to hold a bulk substrate in granular form; an emission system configured to project a waveform into the build chamber from a single side of the build chamber; and a controller configured to control the operation of the emission source to cause phonon generation in particular regions of the granular bulk substrate, wherein the controller is configured to control the phonon generation such that the particular regions of the bulk substrate resonate at a frequency sufficient to cause the bulk substrate to undergo a transformation to produce a portion of an additive manufacturing part.

Embodiment 14. The system according to any preceding embodiment, wherein the controller comprises all or a part of a computer numerical control (CNC) system having a computer model of the additive manufacturing part stored in non-transitory memory, and wherein the controller is configured to control the emission system to cause melting or sintering in the bulk substrate according to the computer model.

Embodiment 15. The system according to any preceding embodiment, wherein the emission system comprises a focusing device having a lens, the lens having one or more materials configured to transduce light into an ultrasonic wave, and the emission system is configured to direct the ultrasonic wave toward the bulk substrate.

Embodiment 16. The system according to any preceding embodiment, wherein the emission system is configured to produce the ultrasonic wave such that when the ultrasonic wave interacts with the bulk substrate, a shockwave is produced within a section of the bulk substrate to produce the portion of the additive manufacturing part.

Embodiment 17. The system according to any preceding embodiment, wherein the emission system is configured to project the waveform into the build chamber from the single side using only a single emission source.

Embodiment 18. The system according to any preceding embodiment, comprising a dynamic template positioned between the build chamber and the emission system, wherein the dynamic template comprises a matrix and a movable material, wherein the matrix is transmittive with respect to the waveform and the movable material is substantially non-transmittive with respect to the waveform.

Embodiment 19. The system according to any preceding embodiment, wherein the dynamic template comprises template control circuitry communicatively coupled to the controller, and the template control circuitry is configured to control the movable material using a magnetic field applied across the dynamic template, using electrical signals applied across the dynamic template, or a combination thereof.

Embodiment 20. The system according to any preceding embodiment, comprising a build chamber actuation system coupled to the build chamber and configured to cause at least a portion of the build chamber to actuate to enable settling of the bulk substrate within the build chamber.

Embodiment 21. A method of manufacturing, comprising: forming a manufacturing part using focused phonon generation by a process comprising: generating phonons in a solid bulk substrate; focusing the phonon generation on sections of the solid bulk substrate to be removed; and controlling the focusing of the phonon generation to generate atomic oscillation in a lattice of the bulk substrate with sufficient energy to remove the solid bulk substrate at a point of focus.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A method of manufacturing, comprising:
    selectively forming an article of manufacture using focused excitation by a process comprising:
        generating vibrations in a base material disposed within a build chamber, wherein generating vibrations in the base material comprises directing an emission through a masking device to mask certain sections of the base material from being subjected to the emission, wherein the masking device comprises one or more screens having a matrix and a movable material, wherein the matrix is transmittive with respect to the emission and the movable material is substantially non-transmittive with respect to the emission;
        focusing the vibrations in a section of the base material; and
        controlling the focusing of the vibrations to cause the section of the base material to undergo a physical transformation to form at least a portion of the article of manufacture; and
        wherein directing the emission through the masking device comprises forming a pattern on the one or more screens corresponding to a portion of the article of manufacture using the movable material and directing the emission through the matrix while blocking the emission with the movable material wherein the emission is coherent light;
        wherein the masking device is configured to transduce the coherent light into a waveform;
        wherein focusing the vibrations on the section of the base material comprises adjusting the masking device to focus the waveform on a focal region corresponding to the section of the base material to undergo a physical transformation; and
        wherein the waveform is selected from the group consisting of infrasonic, sonic, and ultrasonic frequencies.

2. The method of claim 1, wherein generating vibrations in the base material comprises directing the waveform into the base material to cause phonon propagation through a lattice of the section of the base material.

3. The method of claim 2, wherein directing the waveform into the base material comprises directing a first waveform into a phononic or phoxonic crystal using an acoustic source, forming a second waveform from the first waveform in the phononic or phoxonic crystal, and directing the second waveform into the section of the base material.

4. The method of claim 3, wherein forming the second waveform from the first waveform in the phononic or phoxonic crystal comprises directing the first waveform into a focusing region of the phononic or phoxonic crystal having a matrix and inclusions positioned within the matrix, the inclusions having a spatial periodicity corresponding to a desired bandgap in the second waveform.

5. The method of claim 1, wherein the process comprises adjusting the pattern after the portion of the article of manufacture is formed, adjusting the section of the base material in which the vibrations are generated, and forming another portion of the article of manufacture using the adjusted pattern.

6. The method of claim 1, wherein generating vibrations in the base material comprises producing a shock wave at a focal region in the base material, the shock wave resulting in heating, pressure, or both, that sinters the base material at the focal region.

7. The method of claim 1, wherein controlling the focus of the vibrations to cause the section of the base material to undergo the physical transformation comprises increasing a frequency of oscillation within the base material to increase the temperature of the base material to a temperature suitable to cause the physical transformation.

8. The method of claim 7, wherein the process comprises adjusting the frequency of oscillation within the base material of the article of manufacture to remove sections of the article of manufacture and thereby create patterns in the article of manufacture.

9. A method of manufacturing, comprising:
selectively forming an article of manufacture using focused excitation by a process comprising:
generating vibrations in a base material disposed within a build chamber;
focusing the vibrations in a section of the base material; and
controlling the focusing of the vibrations to cause the section of the base material to undergo a physical transformation to form at least a portion of the article of manufacture; and
wherein generating vibrations in the base material comprises directing coherent light to a lens having one or more materials configured to transduce the coherent light into an ultrasonic wave, and directing the ultrasonic wave toward the base material, and wherein focusing the vibrations on the section of the base material comprises adjusting the lens to focus the ultrasonic wave on a focal region corresponding to the section.

* * * * *